United States Patent [19]

Tomii et al.

[11] Patent Number: 4,626,899
[45] Date of Patent: Dec. 2, 1986

[54] BEAM SCANNING DEVICE PRODUCING A HORIZONTALLY UNIFORM ELECTRON BEAM

[75] Inventors: Kaoru Tomii; Hiroshi Miyama; Yoshikazu Kawauchi, all of Kanagawa; Jun Nishida, Tokyo, all of Japan

[73] Assignee: Matsushita Electric Industrial Co., Ltd., Osaka, Japan

[21] Appl. No.: 570,536

[22] Filed: Jan. 13, 1984

[30] Foreign Application Priority Data

| Jan. 14, 1983 | [JP] | Japan | 58-4489 |
| Jan. 14, 1983 | [JP] | Japan | 58-4490 |
| Jan. 20, 1983 | [JP] | Japan | 58-8455 |
| Jan. 20, 1983 | [JP] | Japan | 58-8456 |
| Mar. 16, 1983 | [JP] | Japan | 58-43549 |
| Mar. 29, 1983 | [JP] | Japan | 58-54401 |
| Mar. 29, 1983 | [JP] | Japan | 58-54402 |
| Mar. 29, 1983 | [JP] | Japan | 58-54409 |
| Nov. 25, 1983 | [JP] | Japan | 58-222432 |

[51] Int. Cl.⁴ .................. H04N 9/20; H04N 5/66; H04N 9/12; H01J 29/70
[52] U.S. Cl. .................. 358/65; 358/56; 358/64; 358/66; 358/230; 358/242; 313/409; 313/421; 313/422; 315/13.1; 315/169.1; 315/366
[58] Field of Search .................. 358/56, 64, 65, 66, 358/230, 242; 313/409, 411, 413, 414, 421, 422, 458, 460, 491, 492, 495, 496, 497, 426, 427, 432, 439, 441, 444, 446, 449; 315/13.1, 366, 169.1, 169.2, 169.3, 169.4

[56] References Cited

U.S. PATENT DOCUMENTS

| 3,936,697 | 2/1976 | Scott | 313/495 |
| 3,997,812 | 12/1976 | Stahle et al. | 313/458 |
| 4,158,210 | 6/1979 | Watanabe et al. | 358/230 |
| 4,341,980 | 7/1982 | Noguchi et al. | 315/169.1 |
| 4,408,143 | 10/1983 | Inohara et al. | 313/422 |

FOREIGN PATENT DOCUMENTS 202050 12/1982 Japan .................. 313/496

OTHER PUBLICATIONS

Scott, W. C., et al, "Flat Cathode-Ray-Tube Display", Conference, 1978 SID International Symposium, San Francisco, Apr. 17–21, 1978, SID 78 Digest, pp. 88–89.

Primary Examiner—James J. Groody
Assistant Examiner—Randall S. Svihla
Attorney, Agent, or Firm—Burgess, Ryan & Wayne

[57] ABSTRACT

A flat cathode-ray tube wherein a horizontally uniform sheet-like electron beam is vertically deflected and modulated with a video signal, with the modulated electron beam irradiating a portion of a phosphor screen, includes a modulation electrode assembly arranged by n electrode groups, each consisting of at least one first electrode group and at least one second electrode group, the first electrode group having vertically elongated stripe electrodes, each having one or n (n is an integer of 2 or more) openings or slits corresponding to each pel and which are aligned in the horizontal direction on at least one plane such that all openings are equidistantly formed, the second electrode group having the same construction as the first electrode group or being arranged such that vertically elongated stripe electrodes, each having n openings or slits corresponding to n pels along the horizontal direction are aligned on at least one plane to equidistantly form the openings along the horizontal direction, all the openings of the n electrode groups being aligned along an electron beam propagation direction and the n electrode groups being offset by 1/n the pitch along the horizontal direction, wherein the sheet-like electron beam is generated toward the vertical scanning surface of the phosphor screen and is then deflected substantially normal to the phosphor screen, or alternatively, the beam is generated perpendicular to the phosphor screen, and the electron beam can be vertically deflected and then modulated, and vice versa.

18 Claims, 33 Drawing Figures

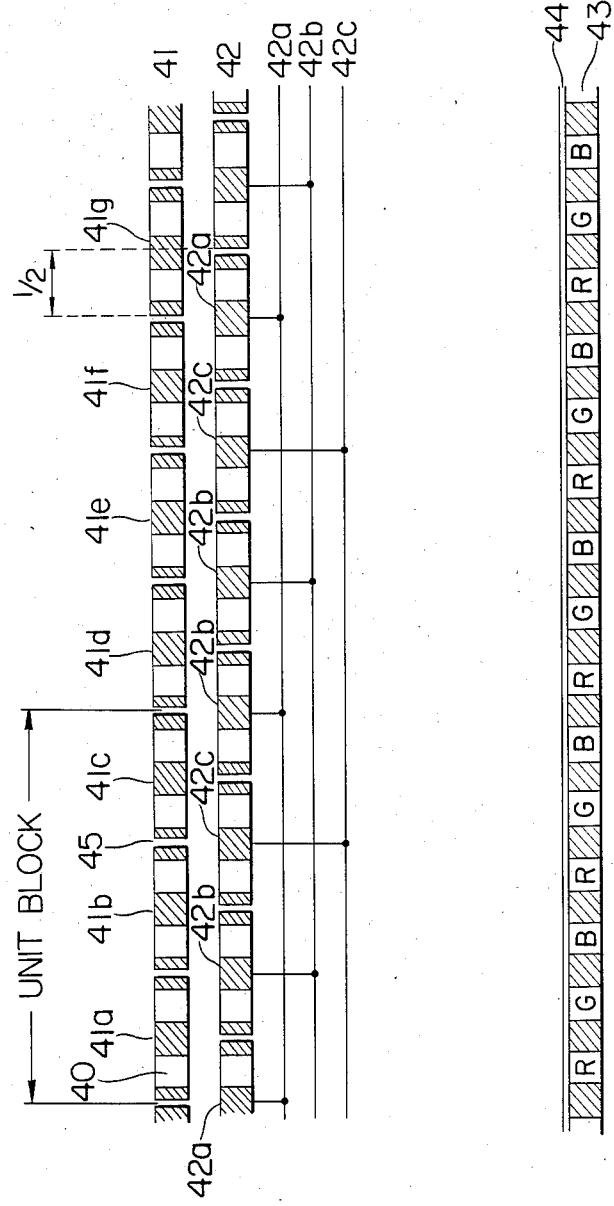

BEAM SCANNING DEVICE PRODUCING A HORIZONTALLY UNIFORM ELECTRON BEAM

BACKGROUND OF THE INVENTION (I) Field of the Invention

The present invention relates to a beam scanning device, such as a cathode-ray tube used in a color image display device such as a terminal display of a color television receiver or a computer.

(II) Description of the Prior Art

Conventionally, many flat cathode-ray tubes (CRT) for television receivers have been available. Typical examples (SID 176 Digest) of the flat cathode-ray tubes which are developed by Zenith Corp. and State University of Arizona are illustrated in FIGS. 1 and 2. In the CRT shown in FIG. 1, horizontal stripe cathodes 11 are vertically aligned parallel to each other. Electron beams emitted from the cathodes 11 are incident on an electron multiplier section 12 to multiply the electrons. The electron beam produced from the electron multiplier section 12 is horizontally expanded in a sheet-like manner. This electron beam is modulated with a color signal by modulation electrodes 14 so as to control the amount of the electron beam passing through the modulation electrodes 14. The controlled electron beam is accelerated by a high anode voltage applied to a phosphor screen 16, thereby activating the phosphors. Electrodes 13 and 15 are used to focus the electron beams. The modulation electrodes 14 are vertically aligned to be parallel to each other and are spaced apart from each other. Different color signals are applied to the respective modulation electrodes 14, respectively, so that a horizontal color image is displayed by horizontal scanning or main scanning on the phosphor screen 16. The subscanning is vertically performed by controlling the cathode potential, so that a two-dimensional color image is displayed on the screen 16.

In the CRT shown in FIG. 2, the cathodes 11 and the electron multiplier section 12 shown in FIG. 1 are modified. Stripe cathodes 22 are arranged between a back plate 21 and mesh electrodes 23 and 24 so as to set an incident angle of the electron beam to be normal to the electrode 13. Any other component of the CRT shown in FIG. 2 is the same as that shown in FIG. 1. The same reference numerals used in FIG. 1 denote the same parts in FIG. 2, and a detailed description thereof will be omitted.

The design of the modulation electrodes 14 presents a problem in the conventional flat CRTs shown in FIGS. 1 and 2. In order to perform color display, R (red), G (green) and B (blue) phosphor stripes 31 are generally formed to constitute a phosphor screen, as shown in FIG. 3. Modulation electrodes 32 must be aligned with the phosphor stripes, respectively. In this case, each set of R, G and B phosphor stripes constitutes a pel or picture element. In order to obtain a high-resolution image, the width of the phosphor stripes must be greatly decreased. Assume that a screen size of 10 inches is given. In order to obtain 340 horizontal pels in this 10" screen, a width of one pel along the horizontal direction becomes about 600 $\mu$m. When this pel is displayed by the R, G and B components, a width of each phosphor stripe becomes 200 $\mu$m. Therefore, the modulation electrodes 32 must be provided at a pitch of 200 $\mu$m. It is difficult to arrange the modulation electrodes 32 at this pitch. Furthermore, about 1,000 modulation electrodes must be used, thus resulting in complex electrical connections.

SUMMARY OF THE INVENTION

It is, therefore, an object of the present invention to provide a color CRT wherein the number of modulation electrodes is decreased without impairing the resolution of the image, and wiring and manufacturing process are simplified.

It is another object of the present invention to provide a color CRT wherein power consumption of an electrode driver circuit is greatly decreased.

According to an aspect of the present invention, there is provided a CRT comprising electron beam generating means for generating a uniform beam in the horizontal direction, electron beam modulating means, and a phosphor screen.

The electron beam modulating means has first electrode means for modulating an electron beam by a modulation signal, and second electrode means for passing/shielding the modulated electron beam.

The first electrode means has a plurality of elongated electrodes which vertically extend to be parallel to each other and each of which has m (m is an integer of 2 or more) openings along the horizontal direction. These electrodes are aligned along the horizontal direction such that the m openings are equidistantly formed along the horizontal direction.

The second electrode means has p (p is an integer of 1 or more) groups of electrodes. Each group of electrodes is arranged such that the electrodes vertically extend to be parallel to each other and each of the electrodes has n (n is an integer of 2 or more) openings. All the openings of the p groups of electrodes are equidistantly formed along the horizontal direction. The p groups of electrodes are spaced apart from each other at predetermined intervals in the electron beam propagation direction, and electrodes of the respective groups are offset by a predetermined distance.

Each electrode of the first electrode means corresponds to m pels. When a modulation signal is applied to each electrode, m adjacent electron beams modulated by this modulation signal propagate toward the phosphor screen. The second electrode means controls to selectively pass/shield the electron beams such that the modulated electron beams are incident on pels (R, G or B phosphor stripes or dots) of the phosphor screen which correspond to the type of applied modulation signal.

Unlike the conventional technique wherein the divided modulation electrodes correspond to the pels, respectively, in the modulation electrodes (i.e., the first electrode means) of the present invention which are integrally formed so as to correspond to m pels, the electron beams are selectively passed/shielded by the second electrode means, thereby obtaining the same high-quality image as in the conventional complex CRT. According to the present invention, the number of modulation electrodes can be decreased to 1/m, the circuit components are accordingly decreased in number, and wiring operation between the circuit components and the modulation electrodes and hence the manufacturing process can be simplified.

In order to obtain the modulated electron beams corresponding to pels of the phosphor screen, one horizontal scanning period (1H) is divided into a plurality of durations (phases). Various modulation signals are applied across the first electrode means. At the same time, the electron beam passing/shielding voltage signals, i.e., ON/OFF signals are selectively applied to the p groups of electrodes of the second electrode means.

In the first electrode means, at least one electrode is grouped as a unit block. The modulation signals are selectively applied to the electrodes of each unit block during each phase of 1H period.

In the second electrode means, the electron beam passing voltage signal (ON signal) and the electron beam shielding voltage signal (OFF signal) are selectively applied to the p groups of electrodes so as to land the electron beams on the desired pel in response to the application of modulation signal to the first electrode means. More particularly, each group of electrodes comprises a plurality of subgroups of electrodes. By a combination of the ON and OFF signals applied to the plurality of subgroups of electrodes, selective control can be performed.

Each group of electrodes of the second electrode means can be arranged on a single plane, or the plurality of subgroups of electrodes of each group can be respectively arranged on different planes along the beam propagation direction while they are horizontally aligned.

Similarly, the plurality of electrodes of the first electrode means may be arranged on a single plane or on different planes without changing the horizontal configuration.

Furthermore, the first and second electrode means can serve as the modulation electrodes during a given phase of the 1H period and as the selection electrodes during another phase of the same 1H period.

A horizontally uniform electron beam can be generated by a plurality of stripe cathodes and can be directly incident on the modulation electrodes. Alternatively, a horizontally uniform electron beam which propagates to be parallel to the modulation electrodes can be generated in a sheet-like form and deflected in a direction substantially normal to the surfaces of the modulation electrodes. The deflected beam can thus be incident on the modulation electrodes.

The electron beam can be horizontally split and modulated after it is vertically defected. Alternatively, the electron beam can be split horizontally by the modulation electrodes and can then be vertically deflected.

Other objects, the features and advantages of the invention will be apparent from the following detailed description when read with the accompanying drawing which shows, by way of example and not limitation, apparatus for realizing the presently preferred embodiment of the invention.

BRIEF DESCRIPTION OF THE DRAWINGS

FIGS. 4A and 4B are respectively a perspective view and a sectional view which show a modulation electrode configuration of a flat CRT according to a first embodiment of the present invention;

DETAILED DESCRIPTION OF THE PREFERRED EMBODIMENTS

Figure 1:
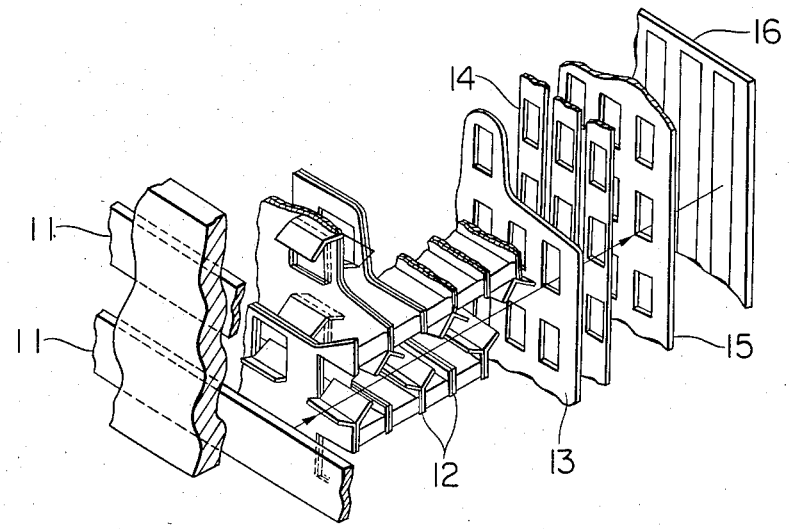
FIG. 1 is an exploded perspective view showing an example of a conventional TV flat cathode-ray tube (CRT)
Figure 2:
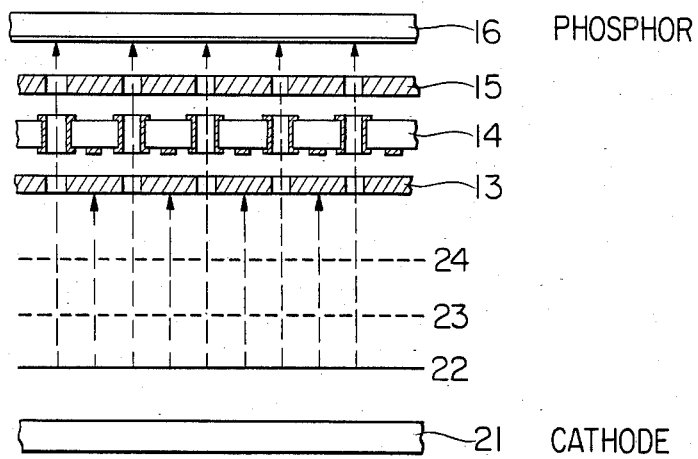
FIG. 2 is an exploded sectional view showing another example of a conventional flat TV CRT.
Figure 3:
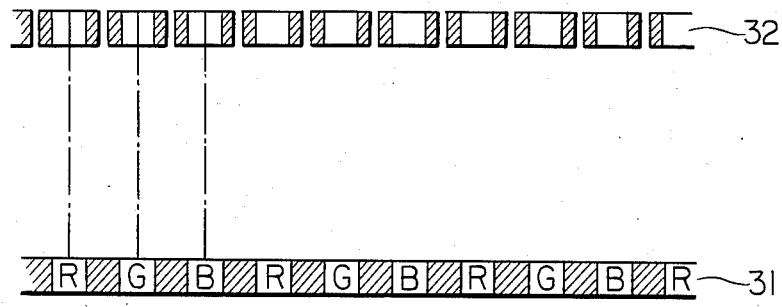
FIG. 3 is a representation showing the positional relationship between a phosphor screen and modulation electrodes of the conventional flat CRT.
Figure 4A:
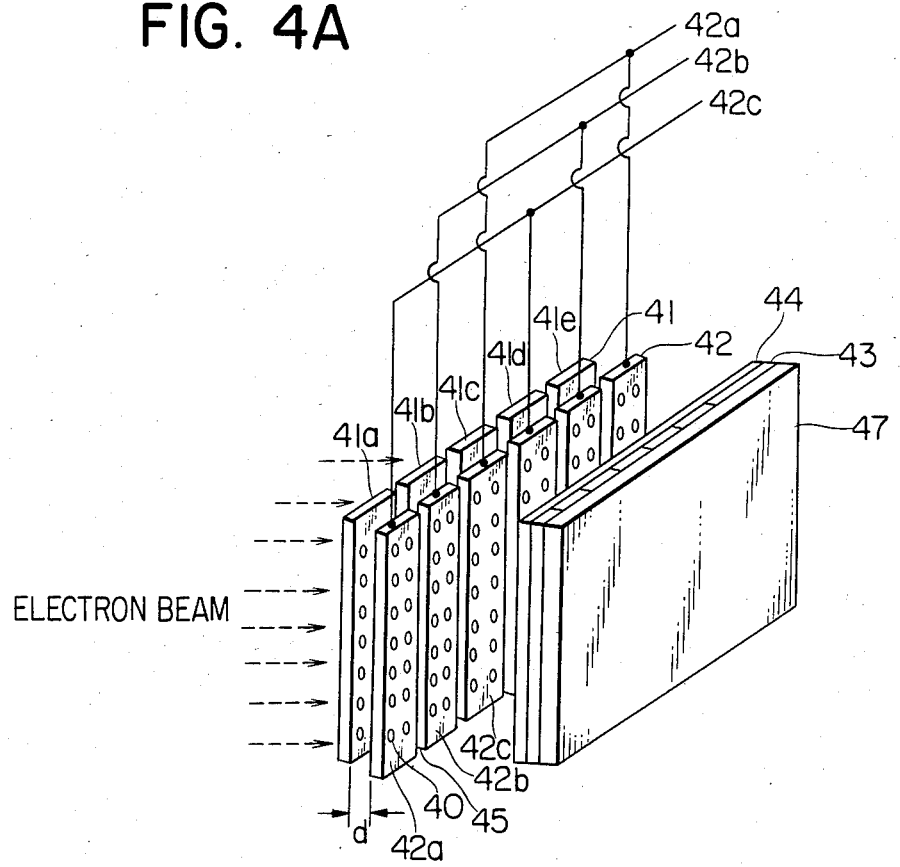

FIGS. 4A and 4B are respectively a perspective view and a sectional view which show a modulation electrode section and a screen section of a flat cathode-ray tube (CRT) according to an embodiment of the present invention. Any other component of the CRT shown in FIGS. 4A and 4B is the same as those shown in FIGS. 1 and 2, and a detailed description thereof will be omitted. Referring to FIGS. 4A and 4B, reference numerals 41 and 42 denote electrode groups, respectively. The electrode group 41 has modulation electrodes 41a, 41b, 41c, ... which are aligned on an identical plane and the electrode group 42 has modulation electrodes 42a, 42b, 42c, ... which are aligned on another identical plane. The modulation electrodes vertically extend and are horizontally aligned to be parallel to each other. Each modulation electrode has two slits, or two circular or square openings 40 along the horizontal scanning direction. The openings 40 which correspond to the number of stripe cathodes are formed along the vertical direction. The electrodes 41a, 41b, 41c, ... are spaced by a distance d from the electrodes 42a, 42b, 42c, ... along the electron beam propagation direction, respectively. The electrodes 41a, 41b, 41c, ... are offset by ½ the electrode pitch from the electrodes 42a, 42b, 42c, ..., along a direction perpendicular to the electron beam propagation direction, respectively. Every third electrode of the electrodes 42a, 42b, 42c, ... of the electrode group 42 are electrically connected. These electrical connections can be performed by simply wiring the corresponding electrodes. However, the electrodes may be formed in a comb electrode configuration which is well-known in a single-tube color camera tube. The electrode group 41 may be disposed in front of or behind the electrode group 42. Reference numeral 43 denotes a phosphor screen; 44, a metallized layer; and 47, a faceplate.

Figure 5:
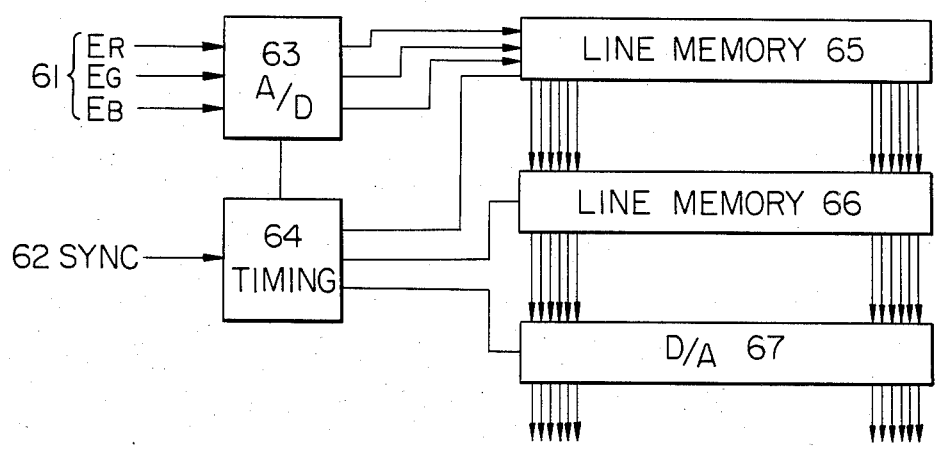
FIG. 5 is a block diagram of a general operation circuit of a flat television monitor.

Before the embodiment shown in FIGS. 4A and 4B is described, a driver circuit system of a television monitor using a flat CRT will be described with reference to FIG. 5 in order to best understand the present invention.

Timing pulses for driving circuit blocks are generated by a timing pulse generator 64 in response to a television sync pulse 62. In response to the timing signals, signals demodulated by R, G and B color signals 61 are converted by an A/D converter 63 to digital signals. The 1H signals of the R, G and B components are stored in a first line memory 65. When all 1H signals are stored in the first line memory 65, these signals are transferred to a second line memory 66. The next 1H signals are stored in the first line memory 65. The 1H signals transferred to the second line memory 66 are retained for the 1H period and are converted into analog signals by a D/A converter 67. The converted analog signals are applied to the modulation electrodes of the flat CRT so as to control the amount of beams. It should be noted that the number of outputs from the D/A converter 67 is the same as that of modulation electrodes of the flat CRT, and that the signals are continuously applied to the corresponding electrodes during the 1H period.

However, as in this embodiment, when the same signal is continuously applied to the modulation electrode which has a set of openings during the 1H period, color display cannot be performed.

Figure 6:
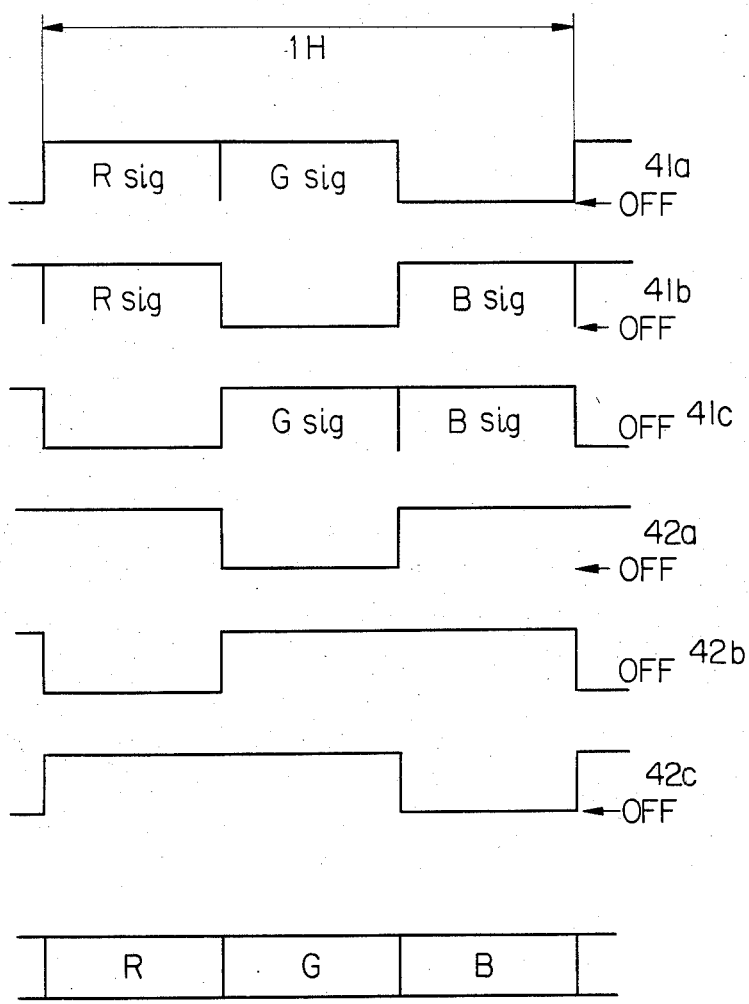
FIG. 6 is a timing chart for explaining the operation of the modulation electrodes shown in FIG. 4.

The operation of the flat CRT shown in FIGS. 4A and 4B will be described with reference to a timing chart of FIG. 6. An R signal is applied to the electrode 41a (FIGS. 4A and 4B) during the first H/3 period. At the same time, an ON voltage (waveform for 42a in FIG. 6) is applied to the electrode 42a so as to pass the electron beam through the openings thereof. Simultaneously, an OFF voltage (waveform for 42b in FIG. 6) is applied to the electrode 42b to shield the beam. As a result, the beams passing through the electrodes 41a and 42a are modulated by the R signal. When a red phosphor is applied to a portion of the screen which receives the electron beam, red light is emitted from the red phosphor. During the first H/3 period, if the R signal is also applied to the electrode 41b and the ON signal is applied to the electrode 42c, the beam modulated by the R signal is incident on the screen. On the other hand, the openings of the electrode 41c correspond to the G and B phosphors, respectively. During the first H/3 period, the OFF signal is applied to the electrode 41c (waveform for 41c in FIG. 6). Therefore, during the first H/3 period, only the red image is obtained. In the second H/3 period, the G signal is applied to the electrodes 41a and 41c, the OFF signal is applied to the electrodes 41b and 42a, and the ON signal is applied to the electrodes 42b and 42c, thereby obtaining a green image. Similarly, in the third and last H/3 period, the B signal is applied to the electrodes 41b and 41c, the OFF signal is applied to the electrodes 41a and 42c, and the ON signal is applied to the electrodes 42a and 42b, thereby obtaining the blue image. In this manner, an R-G-B time serial image is obtained within the 1H period. The afterglow effect of the phosphors and the after image of the viewer allow high-resolution reproduction of the color image. The group of electrodes 41d, 41e and 41f can be driven in the same manner as in the group of electrodes 41a, 41b and 41c, and a detailed description will be omitted.

The above operation is equivalent to a case wherein a plurality of electron beams each provided for a set of R, G and B components are horizontally aligned, and each electron beam is deflected in an order of R, G and B components.

Figure 7:
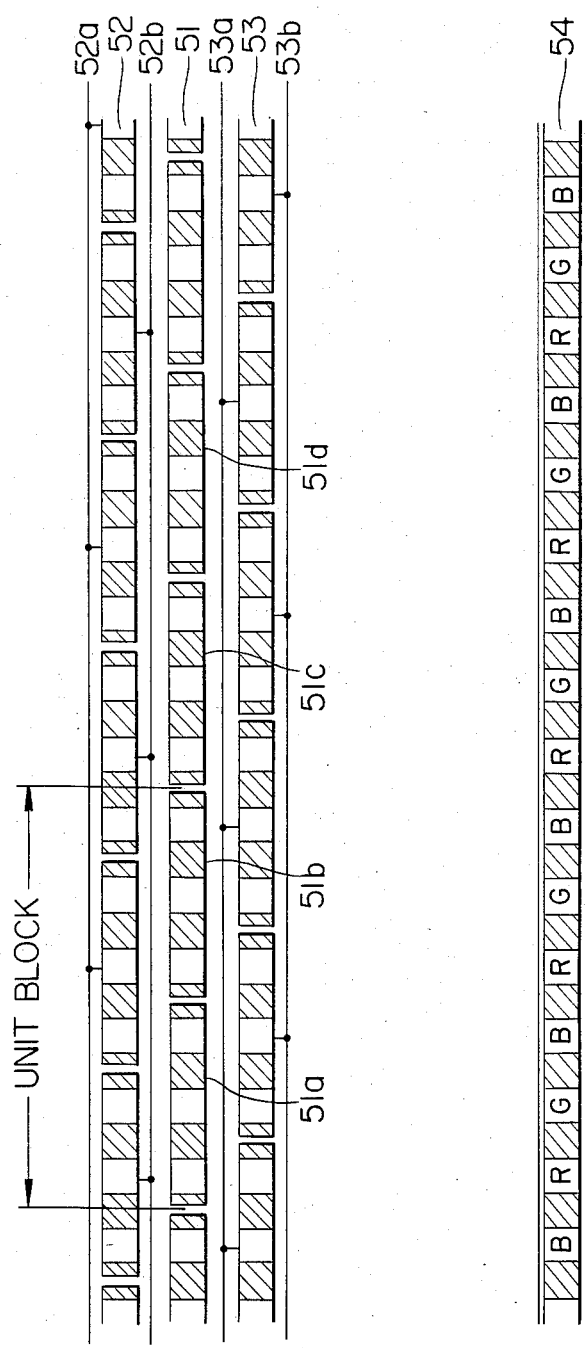
FIG. 7 is a sectional view showing a modulation electrode configuration of a flat CRT according to a second embodiment of the present invention.

FIG. 7 shows a flat CRT according to a second embodiment of the present invention. A modulation electrode group 51 comprises electrodes 51a, 51b, 51c, ..., each having three openings along the horizontal direction, unlike the first embodiment wherein each electrode has two slits. Electrode groups 52 and 53 are arranged to sandwich the electrode group 51 therebetween and are spaced apart from the electrode group 51. Every other electrodes of each of the electrode groups 51 and 53 are electrically connected. The electrode groups 51, 52 and 53 are offset by ⅓ the electrode pitch from each other.

Figure 8:
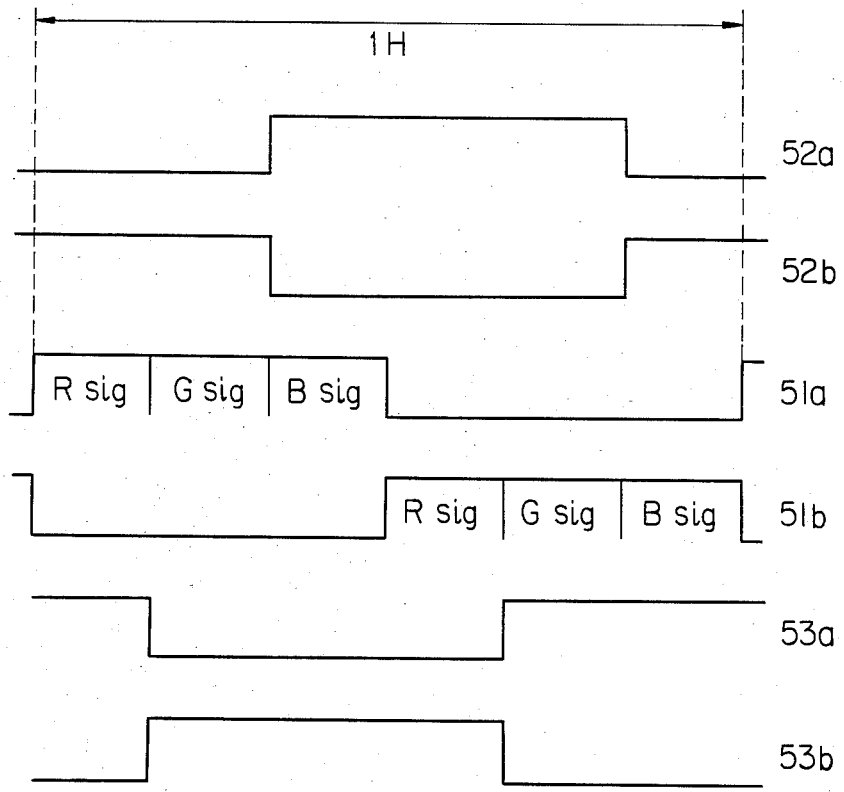
FIG. 8 is a timing chart for explaining the operation of the modulation electrodes shown in FIG. 7.

The operation of the flat CRT of the second embodiment will be described with reference to FIG. 8.

The openings of the respective electrodes correspond to the phosphor stripes of the phosphor screen along the electron beam propagation direction. Every two electrodes such as the electrodes 51a and 51b are given as a unit block.

Assume that the R signal is applied to the electrode 51a. In order to pass the beam through the opening corresponding to the R phosphor stripe of the phosphor screen, the ON voltage must be applied to lines 52b and 53a connected to the respective sets of every other electrodes of the electrode groups 52 and 53. At this time, in order to shield the electron beam from the opening corresponding to the G phosphor stripe, the OFF signal must be applied to a line 53b connected to the remaining electrodes of the electrode group 53. At the same time, the OFF signal is applied to a line 52a and the electrode 51b. As a result, the beam passes through the opening of the electrode 51a which corresponds to the R phosphor stripe, so that the beam becomes incident on the R phosphor stripe. Assume that the G signal is applied to the electrode 51a to irradiate with the beam the G phosphor stripe of a phosphor screen 54. The OFF signal is applied to the lines 52a and 53a and the electrode 51b, and the ON signal is applied to the lines 52b and 53b. Similarly, in order to pass the beam through the opening of the electrode 51a which corresponds to the B phosphor stripe of the phosphor screen 54, the ON signal is applied to the lines 52a and 53b, and the OFF signal is applied to the lines 52b and 53a and the electrode 51b.

When the R, G and B signals are sequentially applied to the electrode 51b and the OFF signal is applied to the electrode 51a, the operation can be performed such that the beams are scanned for two triplets (a triplet is given by a set of R, G and B components) in an order of R, G, B, R, G and B.

In the above embodiments, two or three openings are formed in one electrode. However, in general, the present invention can be applied to an electrode having n (n is a positive integer of 2 or more) openings along the horizontal direction. More particularly, n sets of electrodes each having n openings along the horizontal direction are aligned along the horizontal direction. The n sets are spaced apart from each other along the electron beam propagation direction, and the electrodes of different sets are offset by 1/n the electrode pitch along the direction perpendicular to the electron beam propagation direction. A modulation signal is applied to one set of electrodes, and a predetermined switching signal is applied to the remaining sets of electrodes, thereby modulating the electron beam.

In the plurality of arrays of the modulation electrodes each having two openings along the horizontal direction, the arrays are spaced apart from each other along the electron beam propagation direction, and the electrodes of different arrays are offset by ½ the pitch from each other. At the same time, every other electrode is electrically connected, thereby obtaining the modulation electrode configuration. Furthermore, in the plurality of arrays of modulation electrodes each having three openings along the horizontal direction, the arrays are spaced apart from each other along the electron beam propagation direction, and the electrodes of different arrays are offset by ⅓ the pitch from each other. At the same time, every other electrode (of each array) excluding the modulation electrodes is electrically connected, thereby obtaining the modulation electrode configuration. As is apparent from the above description, unlike the conventional flat CRT wherein the modulation electrodes correspond to the pels, respectively, the number of modulation electrodes can be decreased to ½ or ⅓. Therefore, the circuit elements can be accordingly decreased, and electrical connections between the circuit elements and the modulation electrodes can be simplified.

Figure 9:
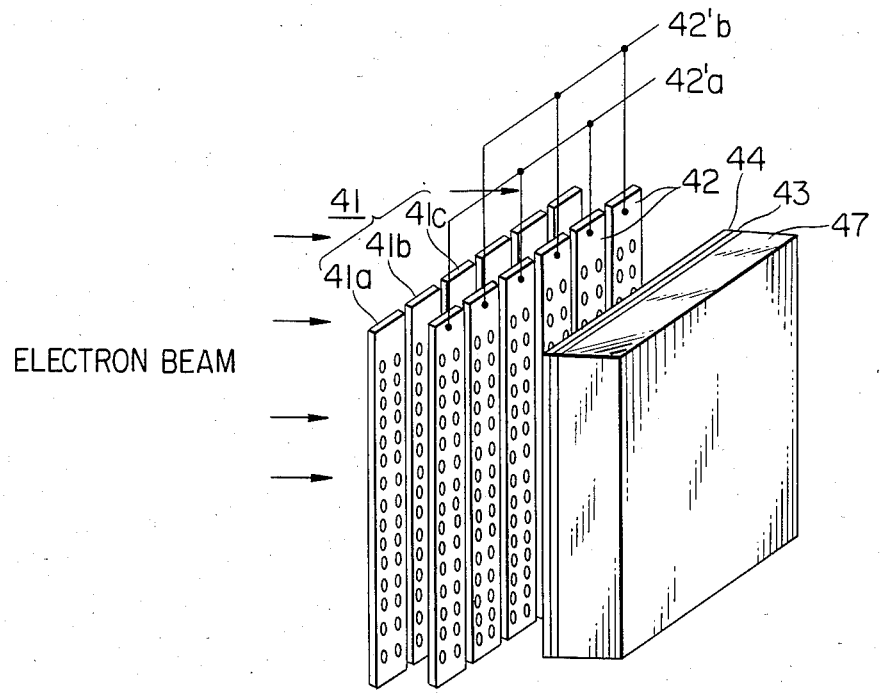
FIGS. 9 and 10 are a perspective view and a sectional view which show the main part of a flat CRT according to a third embodiment of the present invention.
Figure 10:
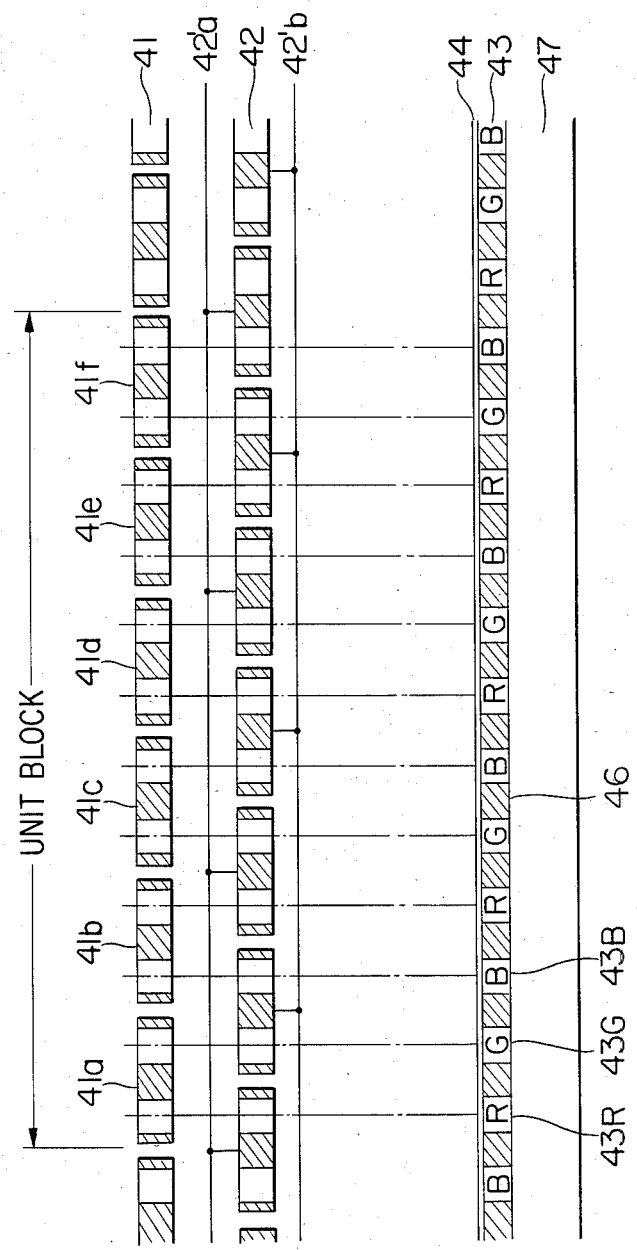

FIG. 9 is a perspective view showing a modulation electrode configuration of a flat CRT according to a third embodiment of the present invention, and FIG. 10 is a sectional view thereof. Any other component of the flat CRT is the same as those shown in FIGS. 1 and 2 and is not illustrated. The same reference numerals used in FIGS. 4A and 4B and FIG. 5 denote the same parts in FIGS. 9 and 10.

Vertically elongated stripe electrodes 41a, 41b, 41c, . . . are horizontally aligned to be parallel to each other so as to constitute a first electrode group as a modulation electrode group 41. Each electrode has two slits, or two circular or rectangular openings along the horizontal direction. An electrode group 42 having the same configuration of the first electrode group is disposed to be spaced apart from the group 41 along the electron beam propagation direction. One set of every other electrodes of the electrode group 42 is connected to a line 42'a, and another set of remaining electrodes is connected to a line 42'b. The electrode group 41 is offset by ½ the electrode pitch from the electrode group 42 along the horizontal direction. R (red), G (green) and B (blue) phosphor stripes 43R, 43G and 43B are embedded in a transparent faceplate 47. A metallized layer 44 is deposited on the phosphor stripes. Black stripes 46 are inserted between any two of the phosphor stripes so as to prevent undesirable color mixing.

Figure 11:
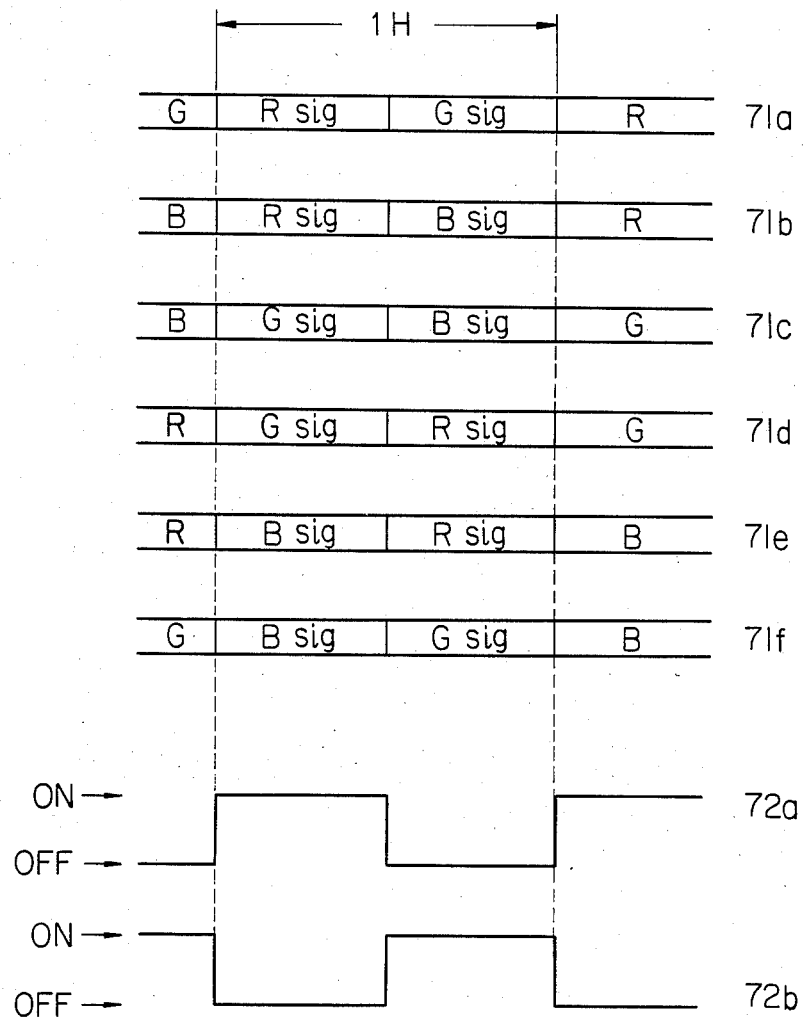
FIG. 11 is a timing chart for explaining the operation of the flat CRT shown in FIG. 9.

FIG. 11 is a timing chart for explaining the operation of the flat CRT shown in FIGS. 9 and 10. The electrodes 41a, 41b, . . . , and 41f of the modulation electrode group 41 are given as a unit block.

In order to pass the electron beam through the opening of the electrode of the electrode group 42 which corresponds to the R phosphor stripe when an R signal Rsig (71a in FIG. 11) is applied to the electrode 41a, a beam ON signal 72a is applied to the line 42'a connected to the electrodes of the electrode group 42. In this case, a beam OFF signal 72b is applied to the line 42'b to shield the electron beam from the G phosphor stripe of a phosphor screen 43. Therefore, while the R signal is applied to the modulation electrode 41a, the beam modulated by this signal is incident on the R phosphor stripe which then emits red light.

Under this condition, the ON signal is applied to the electrodes connected to the line 42'a. Therefore, when the R (71b), G (71c), G (71d), B (71e), and B (71f) signals are respectively applied to the electrodes 41b, 41c, 41d, 41e and 41f, the beams modulated by the corresponding signals pass through the openings of the electrode group 42 and are incident on the corresponding phosphor stripes.

In order to pass the beam through the opening of the electrode of the electrode group 42 which corresponds to a G phosphor stripe when a G signal (71a-Gsig) is applied to the modulation electrode 41a, the OFF signal 72a is applied to the line 42'a, and the ON signal 72b is applied to the line 42'b. As a result, the beam modulated with the G signal by the modulation electrode 41a is incident on the G phosphor stripe.

Under this condition, the ON signal is applied to the line 42'b. Therefore, when the B (71b), B (71c), R (71d), R (71e) and G (71f) signals are applied to the modulation electrodes 41b, 41c, 41d, 41e and 41f, respectively, the beams modulated by the corresponding signals pass through the openings of the electrode group 42 and are incident on the corresponding phosphor stripes.

When the above operation is performed within the 1H period, the 1H video image can be displayed on the monitor. Vertical scanning can be performed in the same manner as in the previous embodiment, so that a two-dimensional image can be displayed on the monitor.

Figure 12:
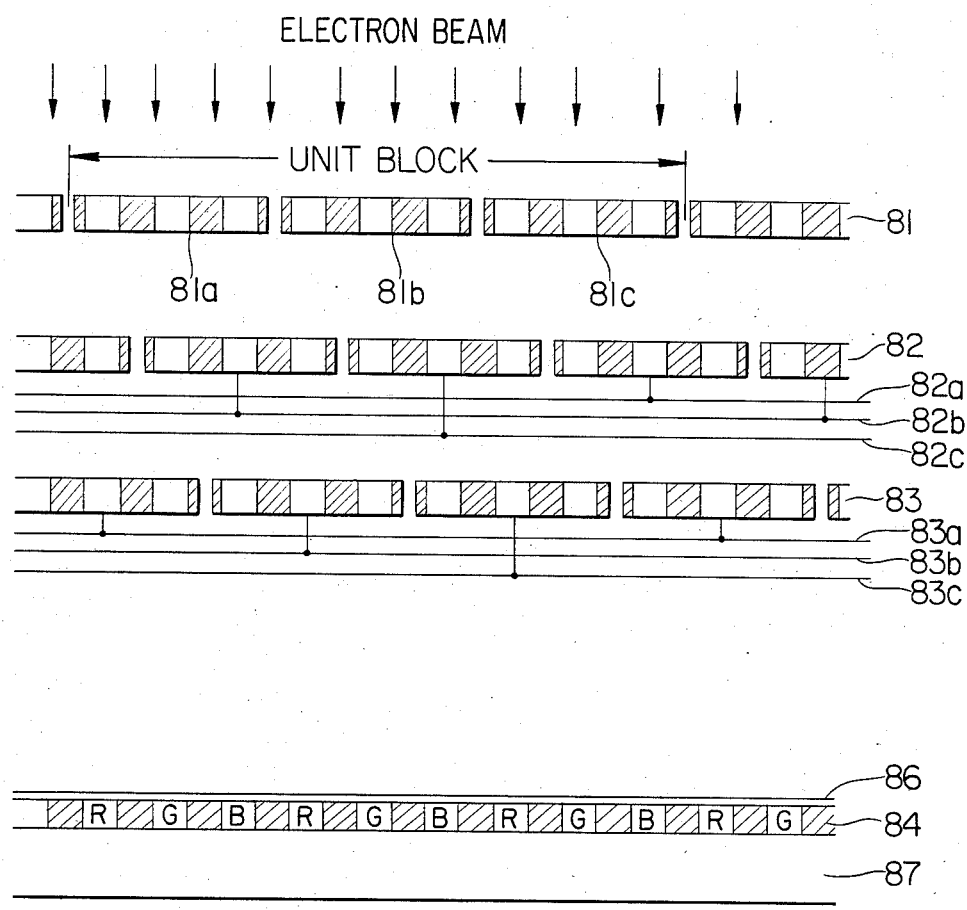
FIG. 12 is a sectional view showing the main part of a flat CRT according to a fourth embodiment of the present invention.

FIG. 12 shows a flat CRT according to a fourth embodiment of the present invention. In the same manner as in the embodiment shown in FIG. 7, vertically elongated stripe electrodes 81a, 81b, 81c, . . . are horizontally aligned to be parallel to each other to constitute a first electrode group as a modulation electrode group 81, and each electrode has three slits, or three circular or rectangular openings along the horizontal direction. Similar electrode groups 82 and 83 are spaced apart from the group 81 along the electron beam propagation direction. Every third electrodes of the electrode group 82 are connected to lines 82a, 82b and 82c, respectively, and every third electrodes of the electrode group 83 are connected to lines 83a, 83b and 83c, respectively. The electrode groups 81, 82 and 83 are offset by ⅓ the electrode pitch from each other along the horizontal direction. Reference numeral 84 denotes a phosphor screen formed on a faceplate 87; 86, a metallized layer formed on the phosphor screen 84.

Figure 13:
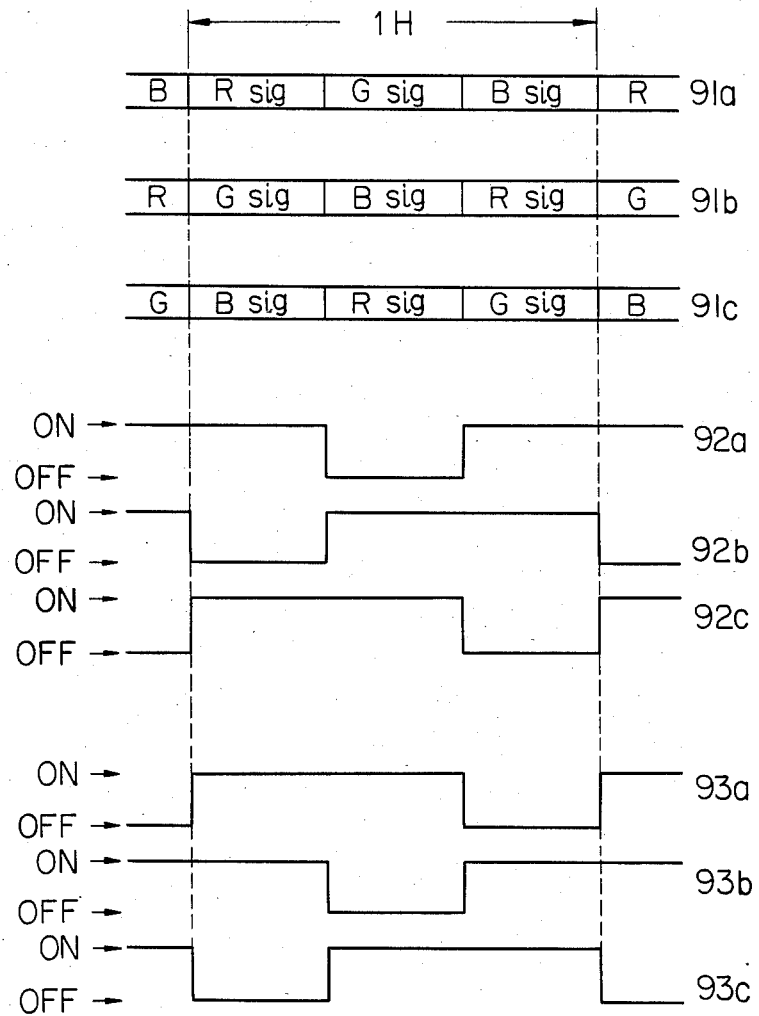
FIG. 13 is a timing chart for explaining the operation of the flat CRT shown in FIG. 12.

The timing chart of the modulation electrode configuration shown in FIG. 12 is illustrated in FIG. 13. In this embodiment, the electrodes 81a, 81b and 81c are given as a unit block.

In order to pass the beam through the opening of the electrode which corresponds to the R phosphor stripe of the phosphor screen 84 when an R signal (91a-Rsig) is applied to the modulation electrode 81a, the ON signal is applied to the electrodes connected to the lines 82a, 82c, 83a and 83b. In this case, in order to shield the beam from the openings which correspond to the G and B phosphor stripes, the OFF signal is applied to the electrodes connected to the lines 82b and 82c. As a result, the beam modulated by the modulation electrode 81a is incident on the R phosphor stripe which emits red light.

Under this condition, when the G and B signals (91b-Gsig) and (91c-Bsig) are respectively applied to the modulation electrodes 81b and 81c, the beams pass through only the openings corresponding to the G and B phosphor stripes and are incident on the G and B phosphor stripes.

In order to pass the beam through the opening corresponding to the G phosphor stripe when the G signal (91a-Gsig) is applied to the modulation electrode 81a, the ON signal is applied to the lines 82b, 82c, 83a and 83c, and the OFF signal is applied to the lines 82a and 83b. In this case, when the B and R signals (91b-Bsig) and (91c-Rsig) are applied to the modulation electrodes 81b and 81c, respectively, the beams pass through the openings corresponding to the B and R phosphor stripes and are incident thereon.

Assume that the B signal (91a-Bsig) is applied to the modulation electrode 81a. When the ON signal is applied to the lines 82a, 82b, 83b and 83c, and the OFF signal is applied to the lines 82c and 83a, the beam passes through the opening corresponding to the B phosphor stripe. Simultaneously, when the R and G signals (91b-Rsig) and (91c-Gsig) are applied to the modulation electrodes 81b and 81c, respectively, the beams pass through the openings corresponding to the R and G phosphor stripes of the phosphor screen 84.

When the above operation is performed within the 1H period, the 1H video image can be displayed on the television monitor.

In the above embodiments, each modulation electrode has two or three openings along the horizontal direction. In general, when the modulation electrode has n (n is an integer of 2 or more) openings along the horizontal direction, the second, third, . . . , and the nth electrode groups are offset by 1/n the electrode pitch along the horizontal direction. At the same time, every nth electrodes each having n openings along the horizontal direction are electrically connected.

The modulation electrode group as the first electrode group need not be arranged in front of the selection electrodes along the electron beam propagation direction.

In the third and fourth embodiments described above, the vertically elongated stripe electrodes are horizontally aligned to be parallel to each other to constitute the first electrode group as the modulation electrode group. When two slits are formed in each electrode, the second electrode group is spaced apart from the first electrode group along the electron beam propagation direction and is offset by ½ the pitch from the first electrode group. Every other electrodes of the second electrode group are electrically connected. However, when three slits are formed in each electrode, the second and third electrode groups are arranged to be spaced apart from the first electrode group. The first to third electrode groups are offset by ⅓ the pitch from each other. Every third electrodes of each of the second and third electrode groups are electrically connected. In this manner, the modulation electrode configuration is prepared irrespective of the number of slits. The color signal is applied to the electrode of the first electrode group, and the ON and OFF signals are selectively applied to the electrodes of the second and third electrode groups. The beam modulated by the color signal is incident on the corresponding phosphor stripe which emits light having the corresponding color.

Unlike the conventional flat CRT wherein the modulation electrodes respectively correspond to the pels along the horizontal direction, the number of the modulation electrodes according to these embodiments can be decreased to 1/n that of the conventional flat CRT. For this reason, the modulation electrode electrodes can be easily manufactured, and the electrical connections between the electrode driver circuit and the modulation electrodes can be decreased, thereby decreasing power consumption of the flat CRT as a whole.

In each of the first to fourth embodiments described above, the n electrode groups are spaced by a predetermined distance from each other along the electron beam propagation direction and are offset by 1/n the electrode pitch along the horizontal direction. The modulation electrode configuration of a flat CRT according to a fifth embodiment will be described with reference to FIG. 14.

Figure 14:
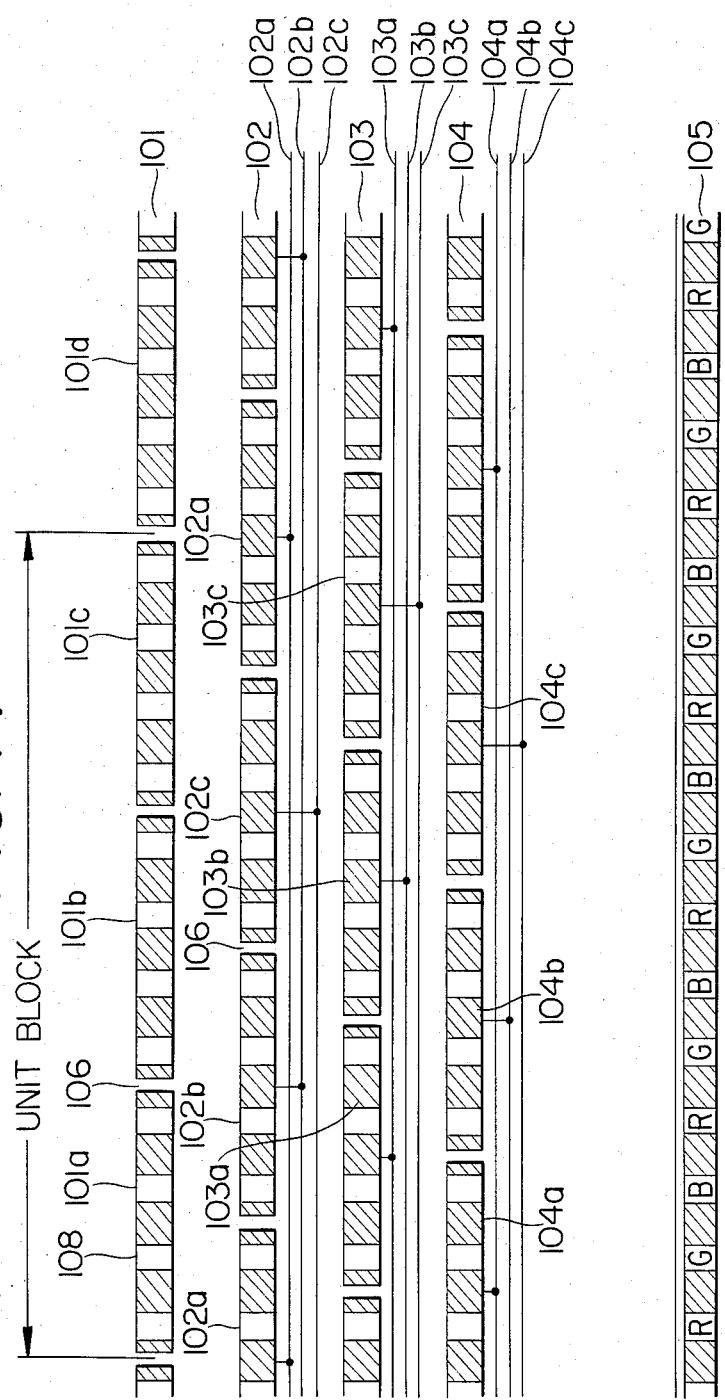
FIGS. 14 and 15 are sectional views of flat CRTs according to fifth and sixth embodiments of the present invention, respectively.

FIG. 14 is a sectional view showing a modulation electrode section and a screen section of a flat CRT of the fifth embodiment. Any other part which is the same as that shown in FIG. 1 or 2 or as another conventional electron beam generating means is not illustrated in FIG. 14. Reference numerals 101, 102, 103 and 104 denote modulation electrode groups, respectively. The modulation electrode groups 101, 102, 103 and 104 have electrodes 101a, 101b, 101c, . . . , electrodes 102a, 102b, 102c, . . . , electrodes 103a, 103b and 103c, . . . , and electrodes 104a, 104b, 104c, . . . , respectively. Each electrode has four slits or four circular or rectangular openings 108 along the horizontal direction. The number of openings 108 along the vertical direction is the same as that of electron beam sources. The electrodes of each group are aligned in a single plane and are spaced by a space 106 from each other. The electrode groups 101, 102, 103 and 104 are disposed to be spaced by a predetermined distance from each other along the electron beam propagation direction. It is important to align the openings 108 in a matrix form and to offset the spaces 106 by a predetermined distance along the horizontal direction. The spaces 106 except the spaces of the electrode group 101 exposed to the electron beam are formed such that the electron beam will not pass through the spaces 106 and that the spaces will not align with the openings 108. Each of the electrodes of the first electrode group receives a different modulation signal. Every third electrodes of each of the second to fourth electrode groups are electrically connected along the horizontal direction, and are grouped to constitute a unit block having three electrodes connected to different lines. The ON/OFF signal is applied to each set of the every third switching electrodes.

The electron beam modulated by the electrode group passes through a corresponding opening and is incident on a corresponding phosphor 105 of the phosphor screen, thereby displaying an image or a character.

The modulation electrodes and the first to third switching electrode groups are arranged in an order named to constitute the modulation electrode section. However, the order may change if the electrode groups are properly offset from each other along the horizontal direction.

Figure 15:
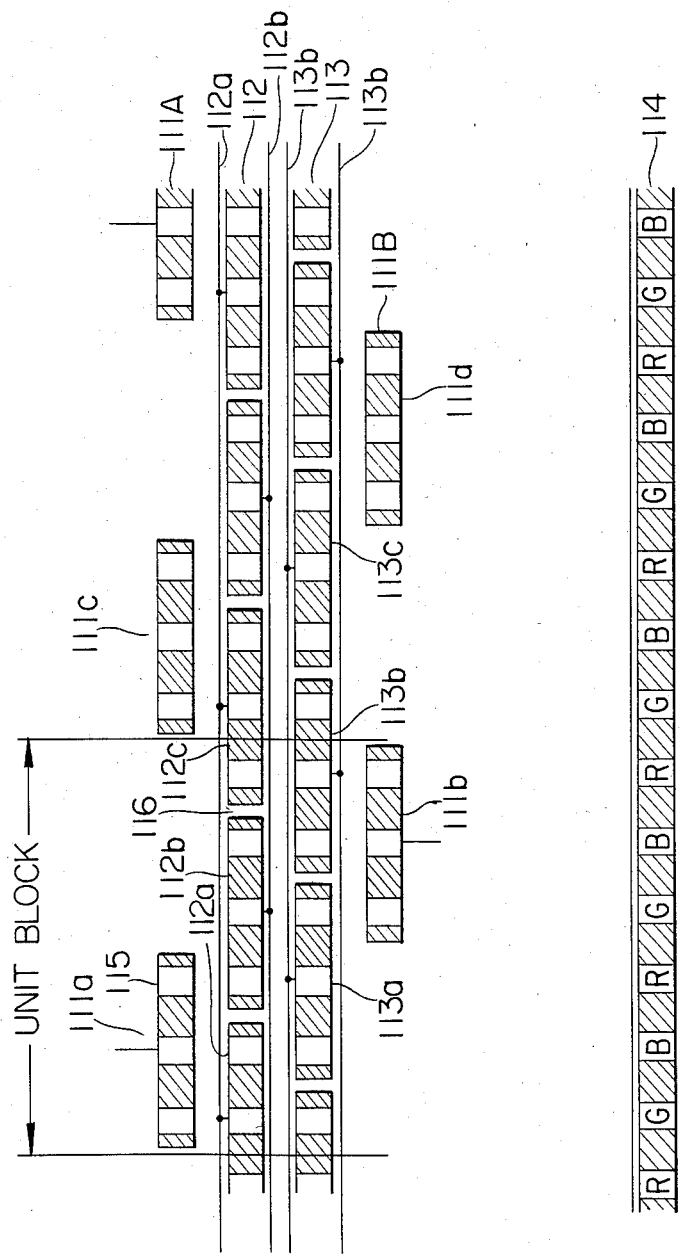

In each of the above embodiments, the electrodes of each electrode group are aligned on the identical plane. However, they may be offset along the electron beam propagation direction under the condition that they are properly offset from each other along the horizontal direction. A typical example is illustrated as a sixth embodiment in FIG. 15.

Electrode groups of the modulation electrode section comprise two switching electrode groups 112 and 113 and modulation electrode subgroups 111A and 111B which are repsectively disposed on either side of the switching electrode groups 112 and 113. The electrode subgroups 111A and IIIB have electrodes 111a, 111c, . . . , and electrodes 111b, 111d, . . . , respectively. The electrode groups 112 and 113 have electrodes 112a, 112b, 112c, . . . , and electrodes 113a, 113b, 113c, . . . , respectively. The electrodes 112a, 112b, 112c, . . . are aligned on an identical plane to be spaced by a space 116 from each other along the horizontal direction, and the electrodes 113a, 113b, 113c, . . . , are also aligned on another identical plane to be spaced by the space 116 from each other along the horizontal direction. However, the electrodes 111a, 111b, 111c and 111d, . . . are not aligned on the same plane. Each electrode has three slits, or three circular or rectangular openings 115 along the horizontal direction. The number of openings 115 along the vertical direction of each electrode is the same as that of electron beam sources. The modulation electrode subgroups 111A and 111B are arranged to sandwich the switching electrode groups 112 and 113. The positional relationship between the electrodes 111a (111c) of the electrode subgroup 111A and the electrode 111b (111d) of the subgroup 111B along the horizontal direction is maintained in the same manner as in the switching electrodes having a space between any two adjacent electrodes along the horizontal direction. The three electrode groups comprising the subgroups 111A and 111B and the switching electrode groups 112 and 113 are offset by ⅓ the pitch from each other along the horizontal direction. The operation of the modulation electrode section of this embodiment is the same as that of the embodiment shown in FIG. 7. The modulation signals are selectively applied to the subgroups 111A and 111B, and the ON and OFF signals are selectively applied to the switching electrode groups 112 and 113. The electron beam modulated by a corresponding color signal is incident on a predetermined phosphor 114 of an anode formed on an inner surface of an envelope, so that the predetermined phosphor emits light having a predetermined color, thereby displaying an image or a character. In this embodiment, the modulation electrode subgroups 111A and 111B are disposed to sandwich the switching electrode groups 112 and 113 along the electron beam propagation direction. However, the modulation electrode subgroups 111A and 111B may be disposed to sandwich the switching electrode group 112 to obtain the same effect as in the above embodiment. Furthermore, switching electrodes in place of the modulation electrodes can be aligned in a divided manner on different planes in the electron beam propagation direction. The modulation electrodes and the switching electrodes 112 and 113 need not be disposed in the order named along the electron beam propagation direction. When the electrode groups of the modulation electrode section are disposed in a divided manner on different planes along the electron beam propagation direction, a distance between the modulation electrode subgroups is increased, thereby decreasing an electrostatic capacitance and simplifying the circuit arrangement and signal application.

Figure 16:
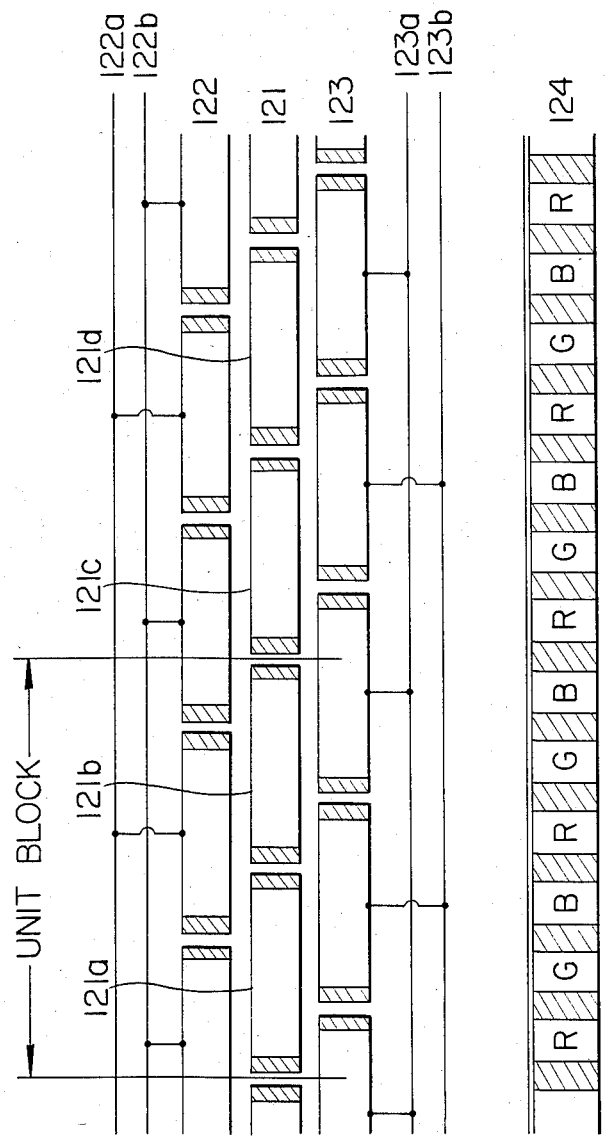
FIG. 16 is a sectional view showing an electron beam modulation section of a flat CRT according to a seventh embodiment of the present invention.

FIG. 16 shows a modulation section of a flat CRT according to a seventh embodiment of the present invention. Unlike the modulation electrodes as described previously and above, a plurality of stripe electrodes are aligned at the identical pitch to constitute a first electrode group 122. Each electrode has a single opening which correspond to the R, G and B phosphors. A second electrode group 121 having a plurality of electrodes each having the single opening in the same manner as those of the first electrode group 122 is offset by ⅓ the electrode pitch from the first electrode group 122 along the horizontal direction. Similarly, a third electrode group 123 having a plurality of electrodes each having the same construction as those of the first electrode group 122 is offset by ⅓ the pitch from the second electrode group 121. The first, second and third electrode groups 122, 121 and 123 constitute the modulation electrode section. The operation of the flat CRT of this embodiment is the same as that shown in FIG. 7. Every other electrodes of the first and third electrode groups 122 and 123 are electrically connected to lines 122a and 122b and lines 123a and 123b, respectively. Electrodes 121a, 121b, 121c, 121d, . . . , of the second electrode group 121 are connected to corresponding lines, respectively.

In order to pass an electron beam through an opening corresponding to the R phosphor stripe of a phosphor screen 124 when the R signal is applied to the electrode 121a, the ON signal must be applied to the lines 122b and 123a. In this case, in order to prevent the electron beam from being transmitted through the opening corresponding to the G phosphor of the phosphor screen 124, the OFF signal is applied to the line 123b. Simultaneously, the OFF signal is applied to the line 122a and the electrode 121b. As a result, the beam passes only through the opening corresponding to the R phosphor stripe of the phosphor screen 124 and is incident on the R phosphor stripe which emits red light. In order to pass the electron beam only through the opening corresponding to the G phosphor stripe of the phosphor screen 124 when the G signal is applied to the electrode 121a, the OFF signal is applied to the line 122a, the electrode 121b and the line 123a, and the ON signal is applied to the lines 122a and 123b. In order to pass the electron beam only through the opening corresponding to the B phosphor stripe when the B signal is applied to the electrode 121a, the ON signal is applied to the lines 122a and 123b, and the OFF signal is applied to the lines 122b and 123a and the electrode 121b.

The above operation can be applied when the R, G and B signals are sequentially applied to the electrode 121b. When the above operation is performed within the 1H period, it is regarded that the beams are scanned horizontally for two triplets (a triplet given by the R, G and B components) in an order of R, G, B, R, G and B.

The three modulation electrode groups in the above embodiment are used in the same manner as shown in FIG. 7. However, this embodiment can be applied to a case wherein two modulation electrode groups are used in the same manner as in FIGS. 4A and 4B.

Figure 17:
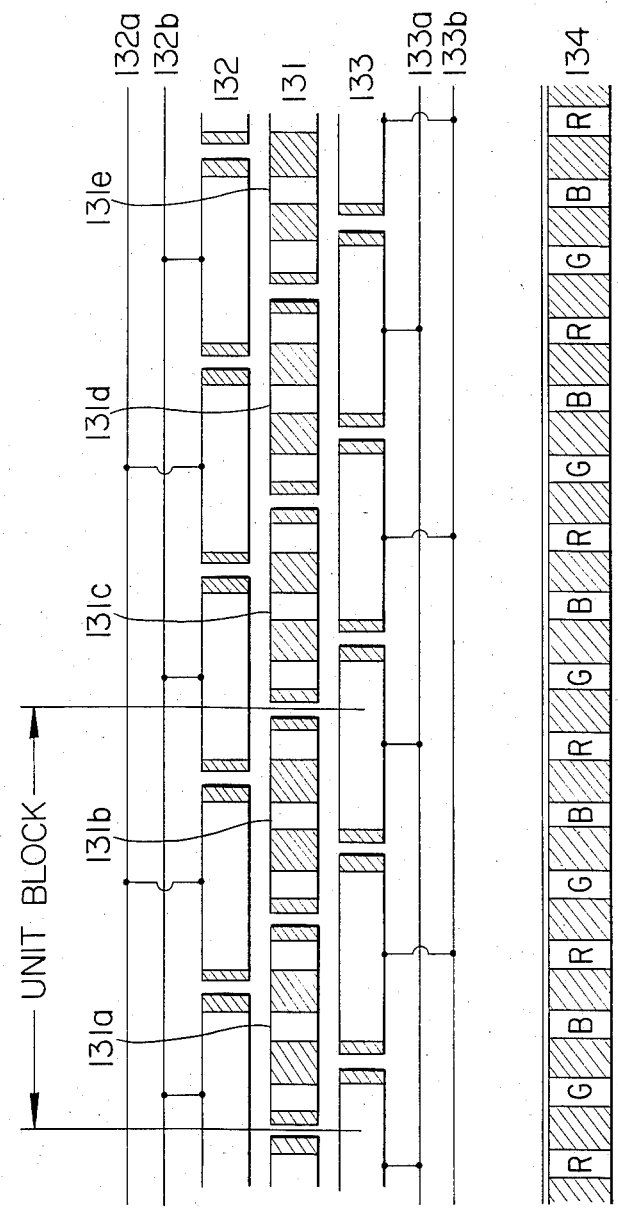
FIG. 17 is a sectional view showing an electron beam modulation section of a flat CRT according to an eighth embodiment of the present invention.

FIG. 17 shows a modulation electrode configuration of a flat CRT according to an eighth embodiment of the present invention. In the same manner as in the embodiment shown in FIG. 16, a first electrode group 132 has a plurality of stripe electrodes each having a single opening corresponding to the R, G and B phosphor elements. The stripe electrodes are aligned at the identical pitch along the horizontal direction. A second electrode group 131 has a plurality of electrodes 131a, 131b, 131c, . . . which are aligned at the same pitch along the horizontal direction and each of which has three openings corresponding to the R, G and B phosphor stripes. The second electrode group 131 is offset by ½ the electrode pitch from the first electrode group 132. A third electrode group 133 which has the same construction as the first electrode group 132 is offset by ½ the pitch from the second electrode group 131. The first, second and third electrode groups 132, 131 and 133 constitute a modulation electrode section. The operation of the modulation electrode section is the same as that shown in FIG. 16. The modulation electrode section comprises the three electrode groups in this embodiment. However, the modulation electrode section may comprise two electrode groups as shown in FIGS. 4A and 4B. In this case, the first electrode group has a plurality of electrodes each of which has a single opening corresponding to any two of the R, G and B phosphors along the horizontal direction. The second electrode group has a plurality of electrodes each of which has two openings respectively corresponding to the remaining two of the R, G and B phosphors along the horizontal direction. The first electrode group is offset by ½ the pitch from the second electrode group along the horizontal direction.

In the embodiment shown in FIG. 17, the electrodes of the first electrode group 132 are the same as those of the third electrode group 133, and only the second electrode group 131 has electrodes each of which has the three openings along the horizontal direction. However, the electrodes of the second electrode group 131 need not have three holes, and instead the electrodes of the first or third electrodes may have three holes. In this case, each of the electrodes of the second electrode group 131 has a single hole. Furthermore, the order of the first, second and third electrode groups 132, 131 and 133 may be changed. In the present invention, the phosphors comprise color phosphors. However, a monochrome phosphor may also be applied. In addition, when the phosphors are uniformly formed, the number of pels which corresponds to each opening is regarded as the actual number of pels excited on the phosphor screen.

In the eighth embodiment described above, the electron beam modulation electrode section comprises a plurality of electrode groups. At least one electrode group comprises electrodes which are aligned at given intervals along the horizontal direction and each of which has a single opening corresponding to n (n is an integer of 2 or more) pels along the horizontal direction. The remaining electrode group or groups have the same construction as the at least one electrode group described above or has a plurality of electrodes which are aligned at given intervals in the horizontal direction and each of which has n openings respectively corresponding to n pels. The electrodes of the respective groups are offset by 1/n the pitch along the horizontal direction. The size of openings is increased, so that the electrode can be easily photoetched to form a large opening. The margin of the large opening can be increased. Even if the size of opening slightly varies, the electron beam can pass therethrough without interruption. As a result, a uniform electron beam spot can be obtained.

Figure 18:
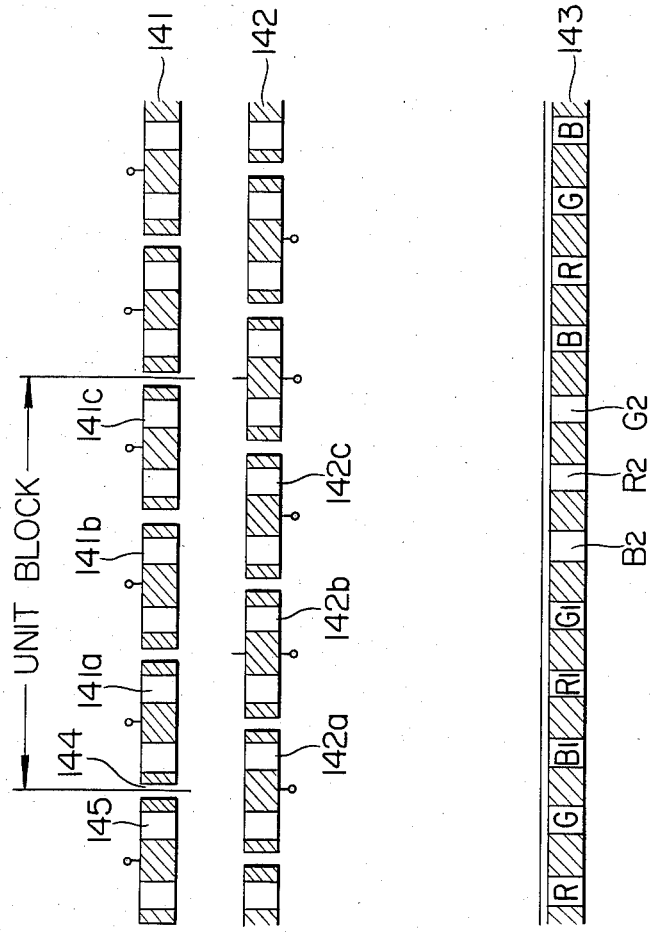
FIG. 18 is a sectional view showing a modulation electrode configuration of a flat CRT according to a ninth embodiment of the present invention.

A modulation electrode section of a flat CRT according to a ninth embodiment of the present invention will be described with reference to FIGS. 18 and 19. The modulation electrodes and the phosphor screen which are shown in FIG. 18 are the same as those shown in FIGS. 4A and 4B. The modulation electrode section comprises electrode groups 141 and 142. The electrode groups 141 and 142 respectively have electrodes 141a, 141b, 141c, . . . which are aligned at predetermined intervals 144 along the horizontal direction and electrodes 142a, 142b, 142c, . . . which are aligned at the predetermined intervals 144 along the horizontal direction. Each electrode has two openings 145 along the horizontal direction and the number of openings which corresponds to that of electron beams or horizontal scanning lines. Each opening 145 has a circular or rectangular shape or comprises a vertically elongated slit. The electrode group 141 is offset by ½ the pitch from the electrode group 142 such that all the openings are aligned along the electron beam propagation direction. The electrodes are prepared such that the lead wires thereof are led outside an envelope so as to allow application of electrical signals thereto.

The operation of the modulation electrode section shown in FIG. 18 will be described with reference to FIG. 19.

Figure 19:
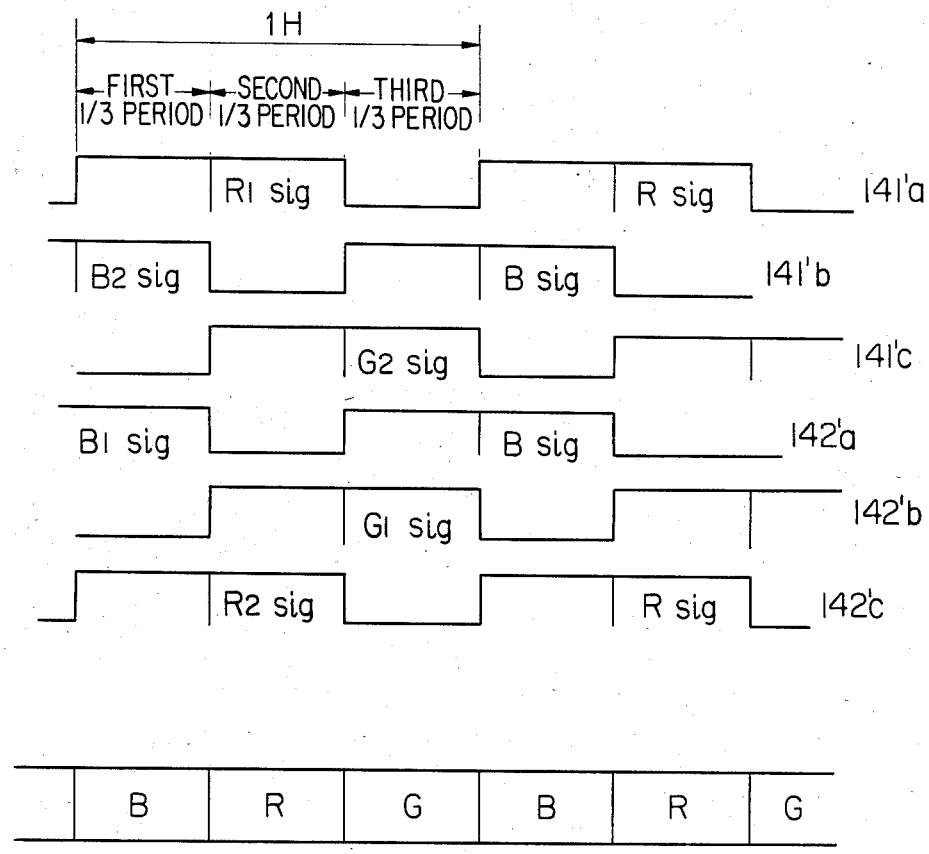
FIG. 19 is a timing chart for explaining the operation of the flat CRT shown in FIG. 18.

Referring to FIG. 19, waveforms 141'a to 142'c indicate signals applied to the electrodes 141a to 142c, respectively. A high level of each waveform indicates a beam ON signal; a high level with a symbol such as $R_1$sig or $B_1$sig indicates a corresponding modulation signal; and a low level thereof indicates a beam OFF signal. As shown in FIG. 19, one horizontal scanning period is divided into first to third H/3 periods. The modulation signals B, G and R, the beam OFF signal and the beam ON signal are selectively applied to the corresponding electrodes in a given order during each H/3 period, thereby displaying a color image on the screen. Particularly, during the first H/3 period, the beam ON signal is commonly applied to the electrodes 141a and 142c, the $B_2$ and $B_1$ modulation signals are respectively applied to the electrodes 141b and 142a, and the beam OFF signal is commonly applied to the electrodes 141c and 142b. The electron beams irradiate phosphor stripes $143B_1$ and $143B_2$ which then emit blue light. Similarly, during the second H/3 period, the signals are applied to the corresponding electrodes, as shown in FIG. 19, so that the electron beams irradiate phosphor stripes $143R_1$ and $143R_2$ which emit red light. During the third H/3 period, the corresponding electrodes are driven to irradiate the corresponding phosphor stripes with the electron beams, thereby emitting green light. In this manner, during each 1H period, the B, R and G modulation signals modulate the electron beams which irradiate the corresponding phosphors. These phosphors emit light rays having predetermined colors. As a result, the afterglow effect and the after image effect allow to display a color image on the screen. Unlike the first to eighth embodiments wherein the modulation signals and switching signals (ON/OFF signal) are selectively applied to the modulation electrodes and the switching electrodes, respectively, the modulation signal and the switching signals are sequentially applied to a given electrode according to the ninth embodiment of the present invention.

Figure 20:
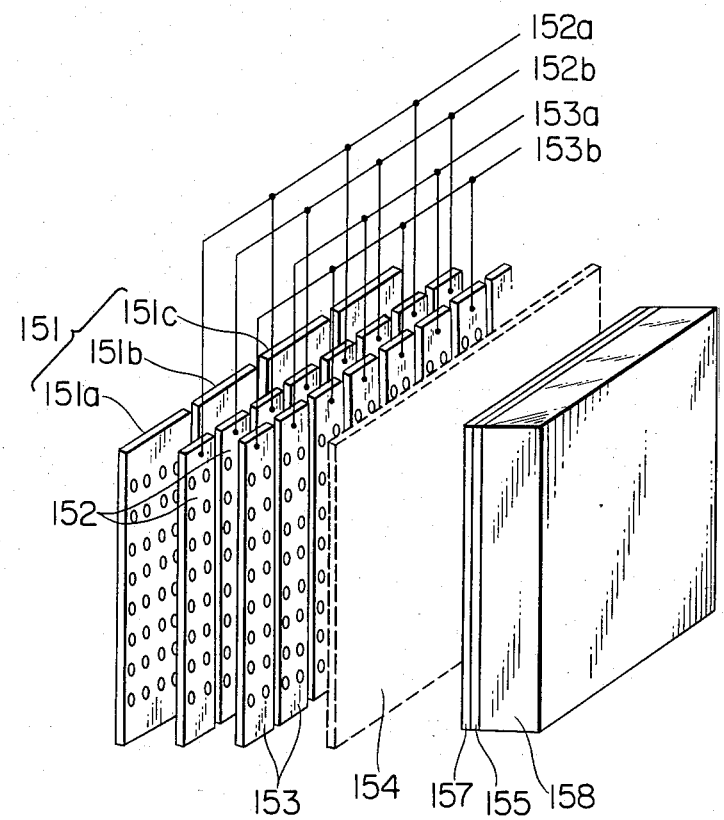
FIGS. 20 and 21 are respectively a perspective view and a sectional view which show a modulation electrode configuration of a flat CRT according to a tenth embodiment of the present invention.
Figure 21:
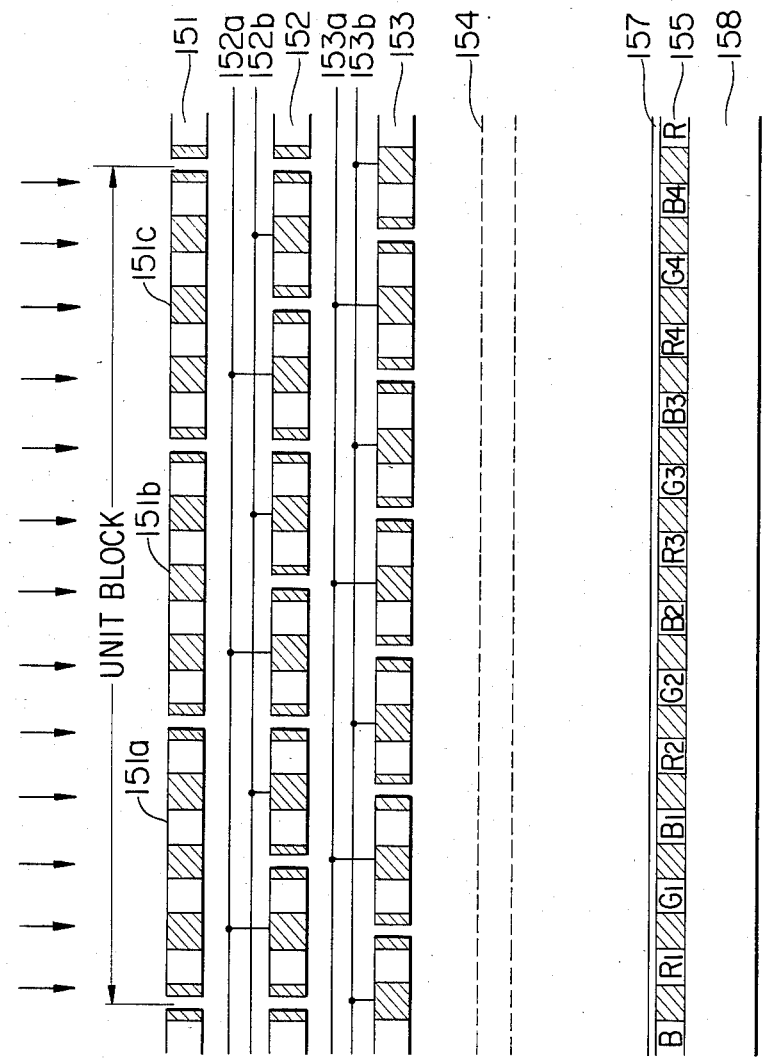

FIG. 20 is a perspective view showing a modulation electrode section of a flat CRT according to a tenth embodiment of the present invention, and FIG. 21 is a sectional view thereof.

A first electrode group 151 as the modulation electrode group comprises vertically elongated stripe electrodes 151a, 151b, 151c, ... which are aligned at given intervals along the horizontal direction and each of which has four slits, or four circular or rectangular openings along the horizontal direction. Second and third electrode groups 152 and 153 respectively comprise electrodes each of which has two slits, or two circular or rectangular openings. The size of the openings of the second and third electrode groups is the same as that of the first electrode groups. Every other electrodes of the second and third electrode groups 152 and 153 are electrically connected to common lines 152a and 152b and common lines 153a and 153b, respectively. The second and third electrode groups 152 and 153 are disposed at given intervals and from the first electrode group 151 along the electron beam propagation direction and are offset by ½ the pitch from each other along the horizontal direction.

The openings of the first and second and third electrode groups 151, 152 and 153 correspond to the R (red), G (green) and B (blue) phosphor stripes of a phosphor screen 155 which are formed on the inner surface of a transparent faceplate 158. A metallized layer 157 is deposited on the phosphor screen 155. A mesh electrode 154 is disposed between the third electrode group 153 and the metallized layer 157 in a conventional manner.

Figure 22:
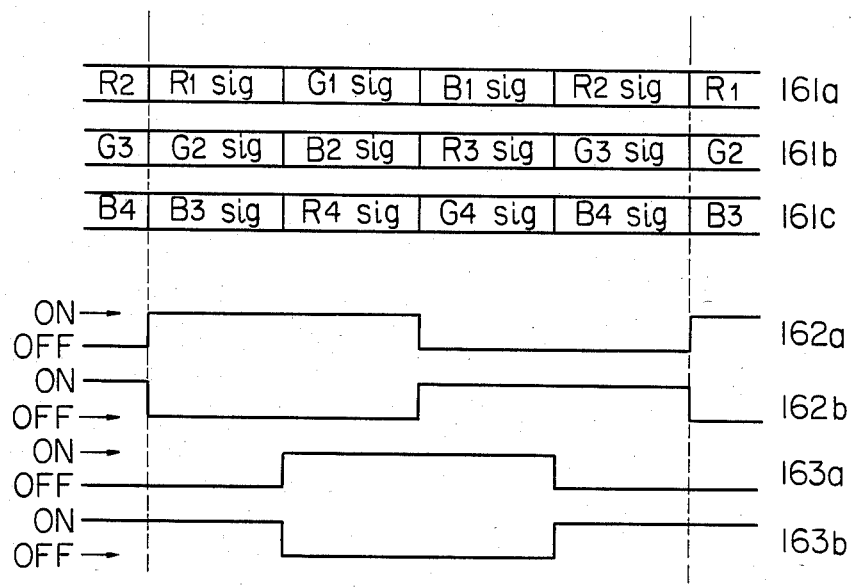
FIG. 22 is a timing chart for explaining the operation of the flat CRT shown in FIGS. 20 and 21.

The operation of the modulation electrode section of the flat CRT shown in FIGS. 20 and 21 will be described with reference to FIG. 22. The electrodes 151a, 151b and 151c of the modulation electrode group 151 shown in FIGS. 20 and 21 are given as a unit block.

In order to pass the electron beam through the opening of the electrode which corresponds to a phosphor stripe $R_1$ of the phosphor screen 155 when an $R_1$ signal (161a-$R_1$sig) is applied to the electrode 151a, a beam ON signal 162a is applied to the line 152a selectively connected to the second electrode group 152 and a beam ON signal 163b is applied to the line 153b selectively connected to the third electrode group 153. However, in this case, the beam must not pass through the openings corresponding to the phosphors ($G_1$, $B_1$ and $R_2$) excluding the phosphor stripe $R_1$. Beam OFF signals 162b and 163a are applied to the lines 152b and 153a which are selectively connected to the second and third electrode groups 152 and 153, respectively.

While the $R_1$ signal is applied to the modulation electrode 151a, the electron beam modulated by the $R_1$ signal passes through the corresponding opening and is incident only on the phosphor stripe $R_1$ which then emits red light.

When a $G_2$ signal (161b-$G_2$sig) is applied to the electrode 151b and a $B_3$ signal (161c-$B_3$sig) is applied to the electrode 151c while the $R_1$ signal is applied to the electrode 151a, the corresponding modulated beams become incident on phosphor stripes $G_2$ and $B_3$.

In this case, in order to pass the electron beam through the opening corresponding to a phosphor stripe $G_1$ when a $G_1$ signal (161a-$G_1$sig) is applied to the modulation electrode 151a, beam ON signals 162a and 163a are respectively applied to the lines 152a and 153a, and beam OFF signals 162b and 163b are respectively applied to the lines 152b and 153b. In this case, when a $B_2$ signal (161b-$B_2$sig) and an $R_4$ signal (161c-$R_4$sig) are applied to the modulation electrodes 151b and 151c, respectively. The beams modulated by these signals pass through the corresponding openings and are incident on the $B_2$ and $R_4$ phosphor stripes, respectively.

In order to pass the electron beam through the opening corresponding to a phosphor stripe $B_1$ when a $B_1$ signal (161a-$B_1$sig) is applied to the modulation electrode 151a, beam ON signals 162b and 163a are respectively applied to the lines 152b and 153a, and beam OFF signals 162a and 163b are respectively applied to the lines 152a and 153b. In this case, when an $R_3$ signal (161b-$R_3$sig) and a $G_4$ signal (161c-$G_4$sig) are respectively applied to the modulation electrodes 151b and 151c, the beams modulated by the $R_3$ and $G_4$ signals pass through the corresponding openings and are incident on the $R_3$ and $G_4$ phosphor stripes, respectively.

In order to pass the electron beam through the opening corresponding to a phosphor stripe $R_2$ when an $R_2$ signal (161a-$R_2$sig) is applied to the modulation electrode 151a, beam ON signals 162b and 163b are respectively applied to the lines 152b and 153b, and beam OFF signals 162a and 163a are respectively applied to the lines 152a and 153a. In this case, when a $G_3$ signal (161b-$G_3$sig) and a $B_4$ signal (161c-$B_4$sig) are respectively applied to the modulation electrodes 151b and 151c, the beams modulated by the $G_3$ and $B_4$ signals pass through the openings and are incident on the phosphor stripes $G_3$ and $B_4$.

When the above operation is performed within the 1H period, the video image during the 1H period is displayed. Furthermore, when vertical scanning is performed in the conventional manner, a two-dimensional television image can be displayed on the screen.

Figure 23:
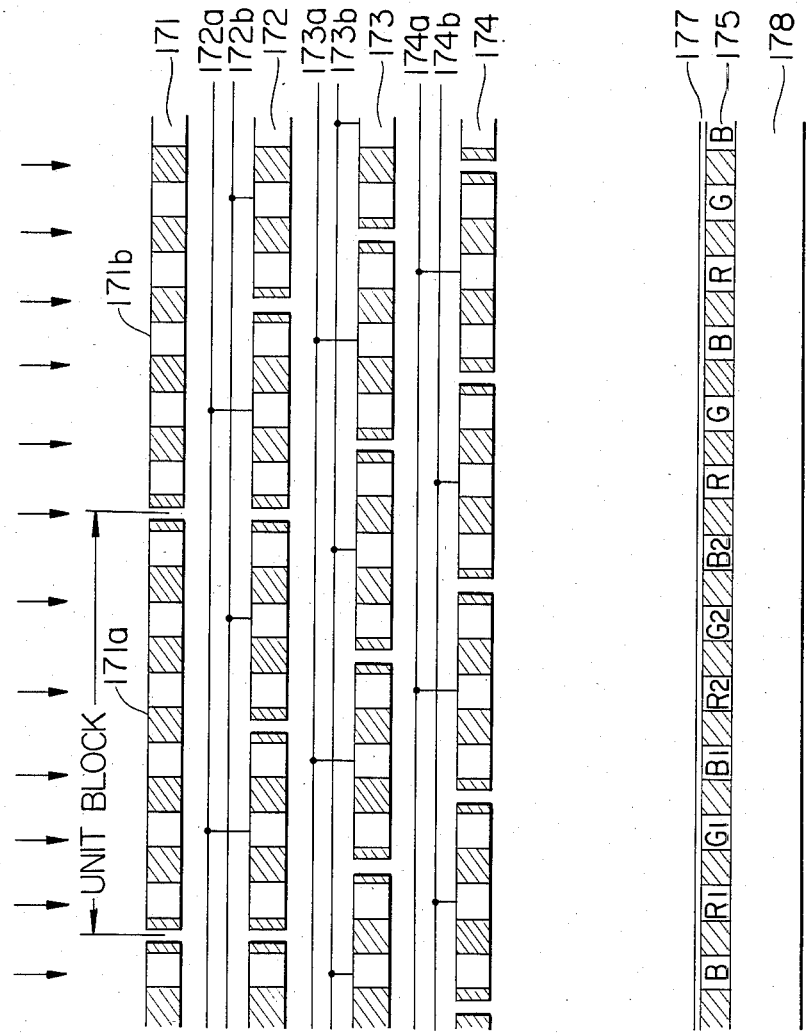
FIG. 23 is a sectional view of a flat CRT according to an eleventh embodiment of the present invention.

FIG. 23 is a sectional view showing the modulation electrode section and the screen section of a flat CRT according to an eleventh embodiment of the present invention. In the same manner as shown in FIG. 21, a first electrode group 171 comprises vertically elongated stripe electrodes 171a and 171b which are aligned at predetermined intervals along the horizontal direction and each of which has six slits, or six circular or rectangular openings along the horizontal direction. Second, third and fourth electrode groups 172, 173 and 174 are disposed at predetermined intervals from each other and the first electrode group 171 along the electron beam propagation direction and are offset by ½ the pitch from each other along the horizontal direction. Each of the electrodes of the second to fourth electrode groups 172 to 174 has three openings along the horizontal direction. Reference numeral 175 denotes a phosphor screen which consists of color phosphor stripes and which is formed on the inner surface of a faceplate 178; and 177, a metallized layer.

Figure 24:
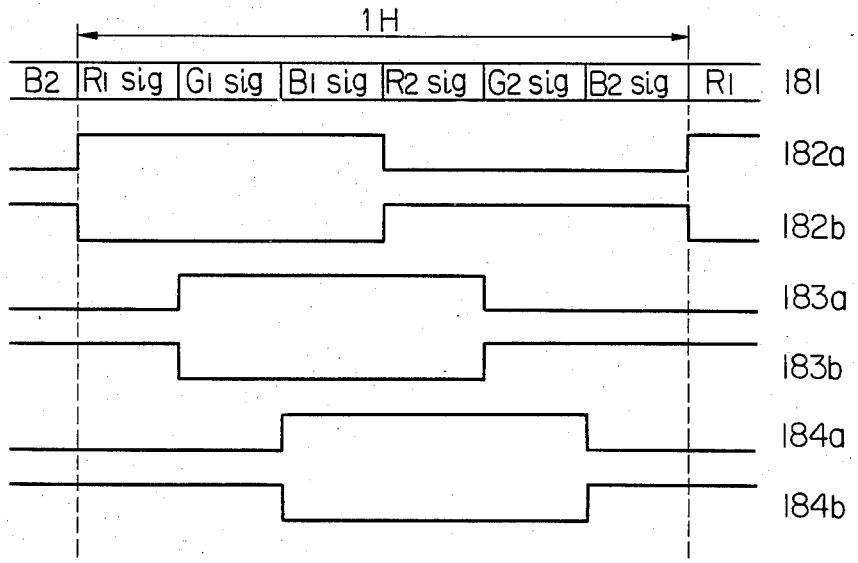
FIG. 24 is a timing chart for explaining the operation of the flat CRT shown in FIG. 23.

FIG. 24 is a timing chart for explaining the operation of the modulation electrode section shown in FIG. 23. Each modulation electrode 171a or 171b is given as a unit block.

In order to cause the electron beam to be incident on a phosphor stripe $R_1$ of the phosphor screen 175, an $R_1$ signal (181-$R_1$sig) is applied to the modulation electrode 171a. A beam ON signal is applied to the electrodes connected to lines 172a, 173b and 174b, and a beam OFF signal is applied to lines 172b, 173a and 174a. Then, an electron beam modulated by the $R_1$ signal becomes incident on the phosphor stripe $R_1$.

In order to cause the electron beam to be incident on a phosphor stripe $G_1$ of the phosphor screen 175, a $G_1$ signal (181-$G_1$sig) is applied to the modulation electrode 171a. A beam ON signal is applied to electrodes connected to the lines 172a, 173a and 174b, and a beam OFF signal is applied to the lines 172b, 173b and 174a.

In order to sequentially cause the electron beams to be incident on the phosphor stripes $B_1$, $R_2$, $G_2$ and $B_2$, the signals are applied to the corresponding electrodes, as shown in FIG. 23.

In each of the embodiments shown in FIGS. 20 to 23, the first electrode group has a plurality of electrodes each of which has 2n (n is an integer of 1 or more) openings. N electrode groups are disposed at predetermined intervals along the beam propagation direction. Each electrode of the n electrode groups has n openings along the horizontal direction. The n electrode groups are offset by 1/n the pitch along the horizontal direction. Every other electrodes of each electrode group are electrically connected. Thus, the modulation electrode section is constituted.

In the modulation electrode section having the configuration described above, the R, G and B color signals are time-serially applied to the electrodes of the first electrode group. The beams modulated by the corresponding color signals are incident on the corresponding phosphor stripes.

When n=2m (m≧1), prepared are m electrode groups. In each electrode group, every other vertically elongated stripe electrodes each having m openings along the horizontal direction are electrically connected. These m electrode groups can be replaced with the third to (n+1)th electrode groups described above. The ON/OFF signal applied to the m electrode groups has a period of H/2. The phase difference between every adjacent electrodes is ($\frac{1}{2}$n)H. In this case, the ON signal is phase-shifted from the OFF signal by 180°. The above modification can be readily understood from the operation of this embodiment.

The first to the (n+1)th electrode groups need not be arranged such that the modulation electrode group is disposed to the electron beam input side. Furthermore, the order of the second to the (n+1)th electrode groups along the beam propagation direction may vary.

In addition to the above modification, the number of horizontal openings of each of the electrodes of the electrode group can be increased to be 3n (n is an integer of 1 or more). The first electrode group as the modulation electrode group comprises vertically elongated stripe electrodes each of which has 3n openings along the horizontal direction. Furthermore, n electrode groups are disposed at predetermined intervals along the beam propagation direction. Each of the n electrode groups has vertically elongated stripe electrodes each having n/3 openings along the horizontal direction. Every third electrodes of each of the n electrode groups are electrically connected, and the n electrode groups are offset by 1/n the electrode pitch from each other along the horizontal direction.

In the modulation electrode configuration described above, the R, G and B signals each having a period of H/3n are selectively applied to modulation electrodes of the first electrode group. The beams modulated by the corresponding color signals are incident on the corresponding color phosphors. For this purpose, the phase difference among the second to the (n+1)th electrodes is given to be ($\frac{1}{3}$n)H. Furthermore, ON/OFF signals having a period of 1H and a phase difference of 120° is selectively applied with a duty of H/3 to the three lines of the electrode groups.

Figure 25:
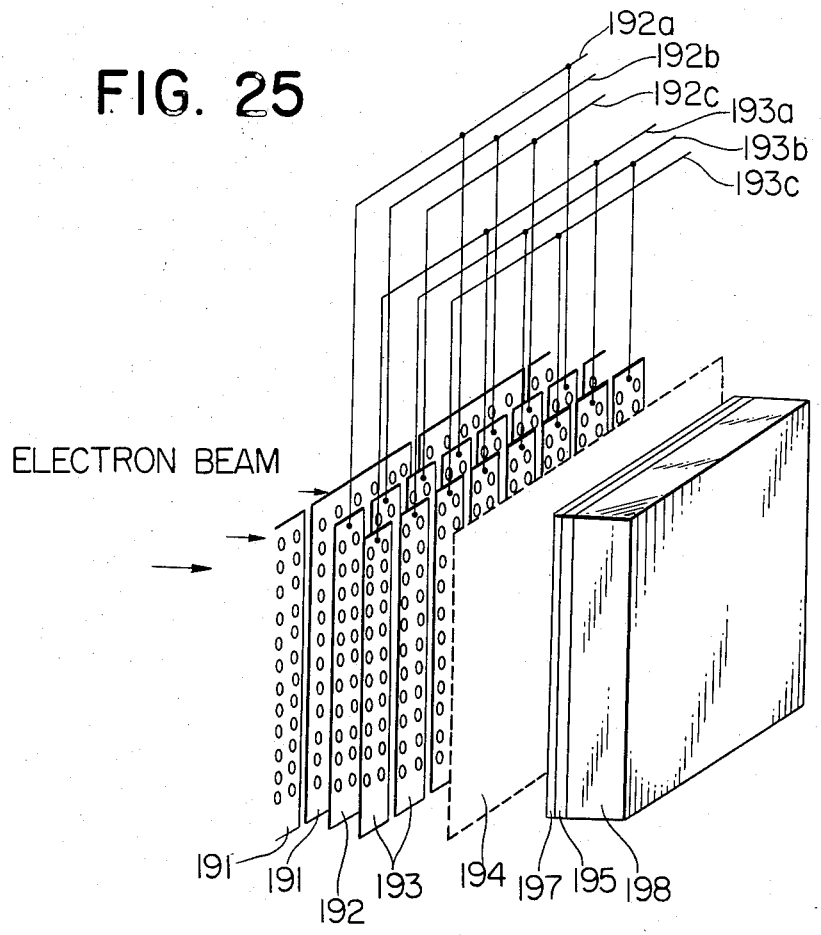
FIGS. 25 and 26 are respectively a perspective view and a sectional view which show a flat CRT according to a twelfth embodiment of the present invention.
Figure 26:
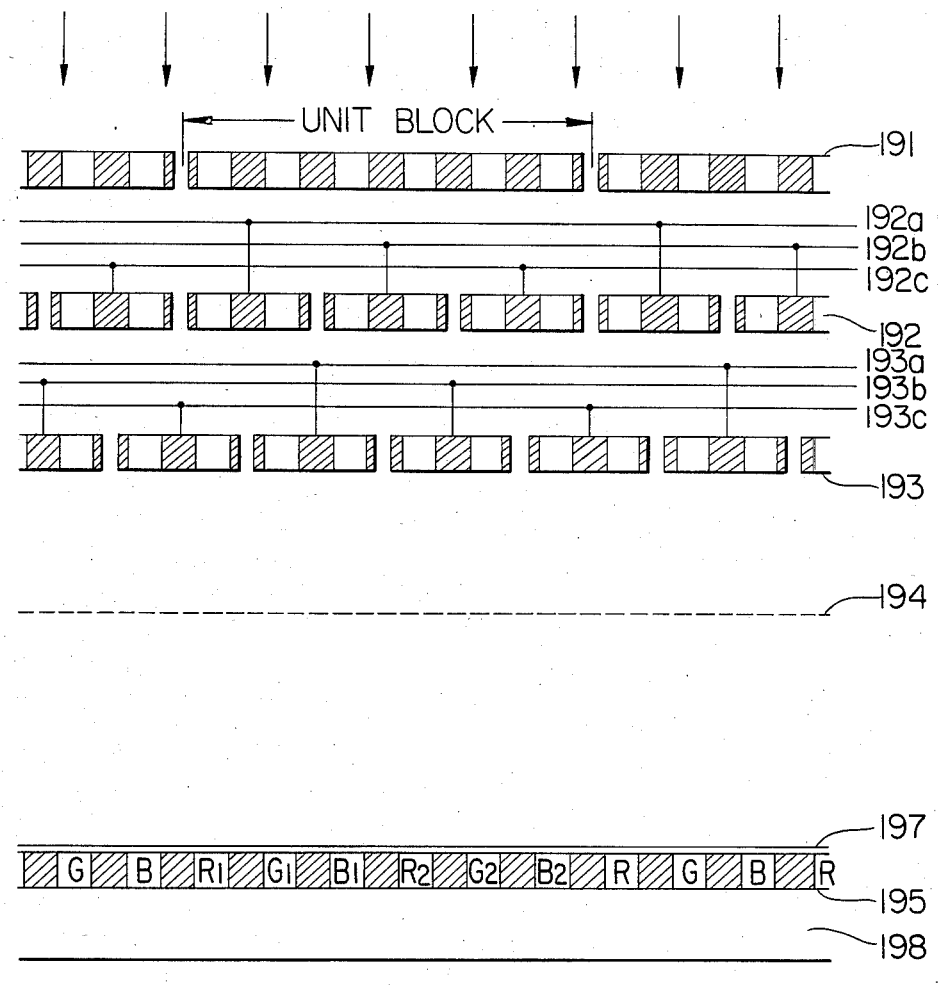

FIGS. 25 and 26 show a twelfth embodiment wherein n=2, that is, the first electrode group has electrodes each of which has six openings along the horizontal direction, and the second and third electrodes respectively have electrodes each having two openings along the horizontal direction.

A first electrode group 191 comprises vertically elongated electrodes which are aligned at predetermined intervals along the horizontal direction and each of which has six slits, or six circular or rectangular openings. Second and third electrode groups 192 and 193 are disposed at a predetermined interval along the electron beam propagation direction and respectively have vertically elongated stripe electrodes each of which has two openings along the horizontal direction. Every third electrodes of the electrode groups 192 and 193 are electrically connected to common lines 192a, 192b and 192c, and common lines 193a, 193b and 193c, respectively. The second electrode group 192 is offset by $\frac{1}{2}$ the electrode pitch from the third electrode group 193.

The openings of the first, second and third electrode groups correspond to all R, G and B phosphor stripes of a phosphor screen 195 which are formed on the inner surface of a transparent faceplate 198. A metallized layer 197 is deposited on the surface of the phosphor screen 195. A mesh electrode or an electrode 194 having openings in a similar manner as in the above electrode groups is inserted between the third electrode group 193 and the metallized layer 197.

The operation of the modulation electrode section having the structure described above will be described with reference to FIG. 27. A modulation electrode 191a, 192b, or . . . , is given as a unit block.

In order to pass the modulated electron beams passing through the openings of the second and third electrode groups 192 and 193 when an $R_1$ signal (201-$R_1$sig in FIG. 27) is applied to the modulation electrode group 191 (191a, 191b, or . . . ) and cause the electron beam to be incident on the phosphor stripe $R_1$ of the phosphor screen 195, a beam ON signal 202a is applied to the line 192a of the second electrode group, and a beam ON signal 203c is applied to the line 193c of the third electrode group. In this case, however, in order to prevent the electron beams from being incident on the phosphor stripes $G_1$, $B_1$, $R_2$, $G_2$ and $B_2$ excluding the phosphor stripe $R_1$, beam OFF signals 202b, 202c, 203a and 203b are applied to the lines 192b and 192c of the second electrode group and to the lines 193a and 193b of the third electrode group.

As is apparent from the above description, while the $R_1$ signal (201-$R_1$sig) is applied to the modulation electrode group 191, the electron beam modulated by the $R_1$ signal passes the corresponding opening and is incident only on the phosphor stripe $R_1$.

In order to pass the modulated electron beam through the corresponding opening and to land it only on the phosphor stripe $G_1$ when a $G_1$ signal (201-$G_1$sig) is applied to the modulation electrode group 191, the same signal as in the case of the $R_1$ phosphor excitation is applied to the lines of the second electrode 192, a beam ON signal 203a is applied to the line 193a of the third electrode group 193, and beam OFF signals 203b and 203c are respectively applied to the lines 193b and 193c.

In order to pass the modulated electron beam through the corresponding opening and to land it only on the phosphor stripe $B_1$ when a $B_1$ signal (201-$B_1$sig) is applied to the modulation electrode group 191, a beam ON signal 202b is applied to the line 192b of the second electrode group 192, beam OFF signals 202a and 202c are respectively applied to the lines 192a and 192c of the second electrode group 192, and the same signal as in the case of the $G_1$ phosphor excitation is applied to the lines of the third electrode group 193.

In order to pass the modulated electron beam through the corresponding opening and to land it only on the phosphor stripe $R_2$ when an $R_2$ signal (201-$R_2$sig) is applied to the modulation electrode group 191, the same signal as in the case of the $B_1$ phosphor excitation is applied to the lines of the second electrode group 192, a beam ON signal 203b is applied to the line 193b of the third electrode group 193, and beam OFF signals 203a and 203c are respectively applied to the lines 193a and 193c of the third electrode group 193.

In order to pass the modulated electron beam through the corresponding opening and to land it only on the phosphor stripe $G_2$ when a $G_2$ signal (201-$G_2$sig) is applied to the modulation electrode group 191, the ON signal 202c is applied to the line 192c of the second electrode group 192, the OFF signals 202a and 202b are respectively applied to the lines 192a and 192b of the second electrode group, and the same signal as in the $R_2$ phosphor excitation is applied to the lines of the third electrode group 193.

Finally, in order to pass the modulated electron beam through the corresponding opening and to land it only on the $B_2$ phosphor stripe when a $B_2$ signal (201-$B_2$sig) is applied to the modulation electrode group 191, the same signal as in the $G_2$ phosphor excitation is applied to the lines of the second electrode group 192, and the same signal as in the $R_1$ phosphor excitation is applied to the lines of the third electrode group 193.

The above operation is performed for each electrode of the electrode group 191 within the 1H period, so that the 1H image can be displayed on the television monitor. Vertical scanning is then performed in the same manner as in the conventional technique, thereby obtaining a two-dimensional image on the television monitor.

Figure 27:
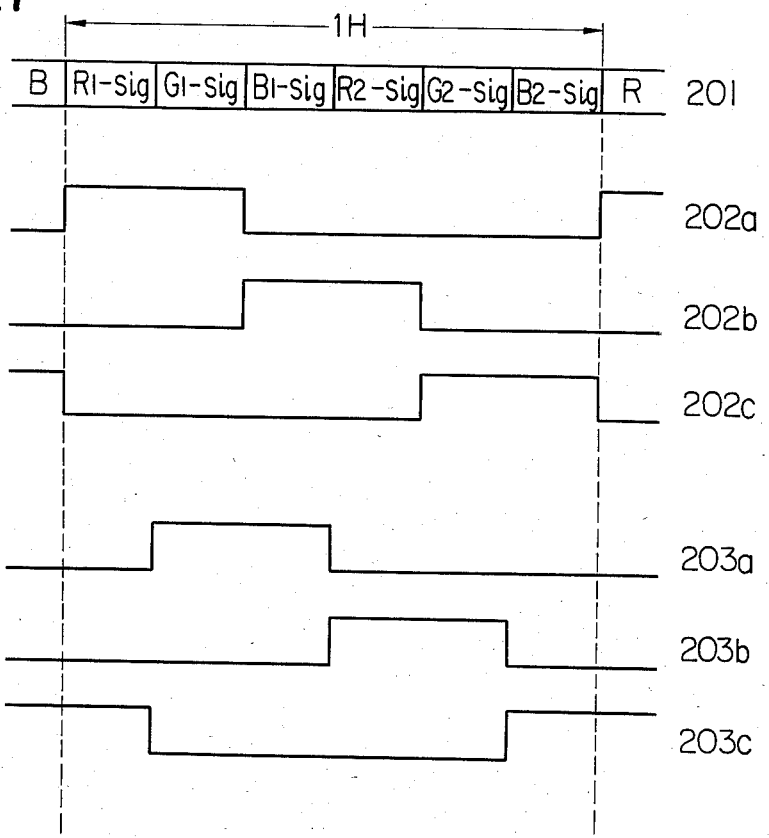
FIG. 27 is a timing chart for explaining the operation of the flat CRT shown in FIGS. 25 and 26.

The voltage waveforms of the signals within the 1H period are illustrated in FIG. 27. Each color signal 201 of H/6 period is applied to the modulation electrode group 191 in an order of $R_1$, $G_1$, $B_1$, $R_2$, $G_2$ and $B_2$. The ON/OFF signals 202a, 202b, 202c, 203a, 203b and 203c each having a period of 1H are selectively applied with a duty of $\frac{1}{3}$ to the lines 192a, 192b, 192c, 193a, 193b and 193c of the second and third electrode groups 192 and 193. A phase difference between the ON/OFF signals to be applied to the lines of the respective electrode groups is H/3, and a phase difference between the electrode groups is H/6.

Figure 28:
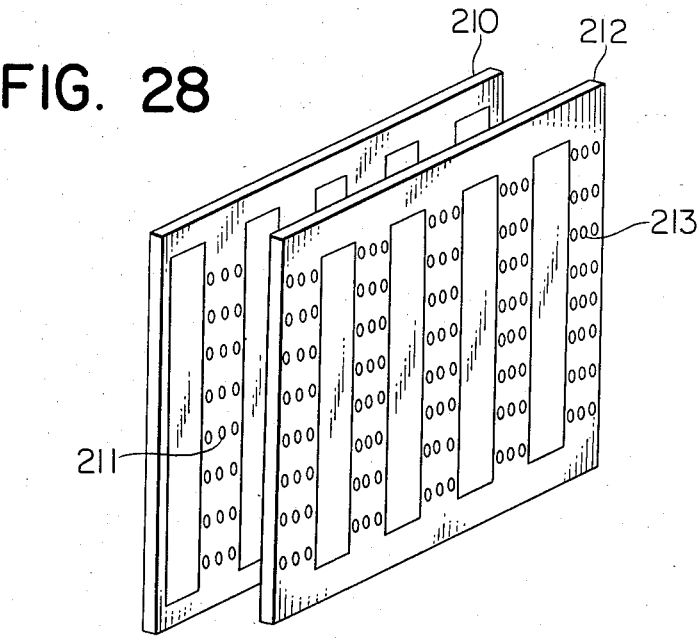
FIG. 28 is a perspective view showing a modulation electrode configuration to be used for a flat CRT according to a thirteenth embodiment of the present invention.

FIG. 28 shows a detailed configuration of a modulation electrode section used for a flat CRT according to a thirteenth embodiment to be described in detail with reference to FIG. 29. In the modulation electrode configuration shown in FIGS. 4A and 4B, the first electrode group 41 as the modulation electrode group comprises the vertically elongated electrodes which are aligned at equal intervals along the horizontal direction and each of which has two openings along the horizontal direction. The second electrode group 42 comprises the vertically elongated electrodes which are aligned at equal intervals along the horizontal direction and each of which has two openings. The first and second electrode groups are offset by $\frac{1}{2}$ the pitch along the horizontal direction. In the modulation electrode configuration shown in FIG. 7, the first, second and third electrodes 52, 51 and 53 are disposed at equal intervals along the electron propagation direction and are offset by $\frac{1}{3}$ the pitch along the horizontal direction. Each of the electrodes has three openings such that all the openings are aligned with each other along the electron beam propagation direction. Every third electrodes of each of the first, second and third electrode groups 52, 51 and 53 are electrically connected. In the modulation electrode configuration shown in FIG. 28, every other electrodes (FIGS. 4A and 4B) electrically connected to the common line, or every third electrodes (FIG. 7) electrically connected to the common line are integrally formed. Referring to FIG. 28, each of comb electrodes of a first electrode plate 210 has openings 211 which are repeatedly formed at given intervals along the horizontal direction. The comb electrodes are connected at the upper and lower ends of the plate 210. A second electrode plate 212 has openings 213 and has the same construction as the electrode plate 210. The first electrode plate 210 is offset by one electrode pitch from the second electrode plate 212 such that the each set of openings 211 do not overlap that of openings 213. The two electrode plates 210 and 212 constitute an electrode assembly (only two electrode plates are illustrated in FIG. 28). The modulation electrode section using more than one such electrode assemblies is illustrated as the thirteenth embodiment in FIG. 29.

Figure 29:
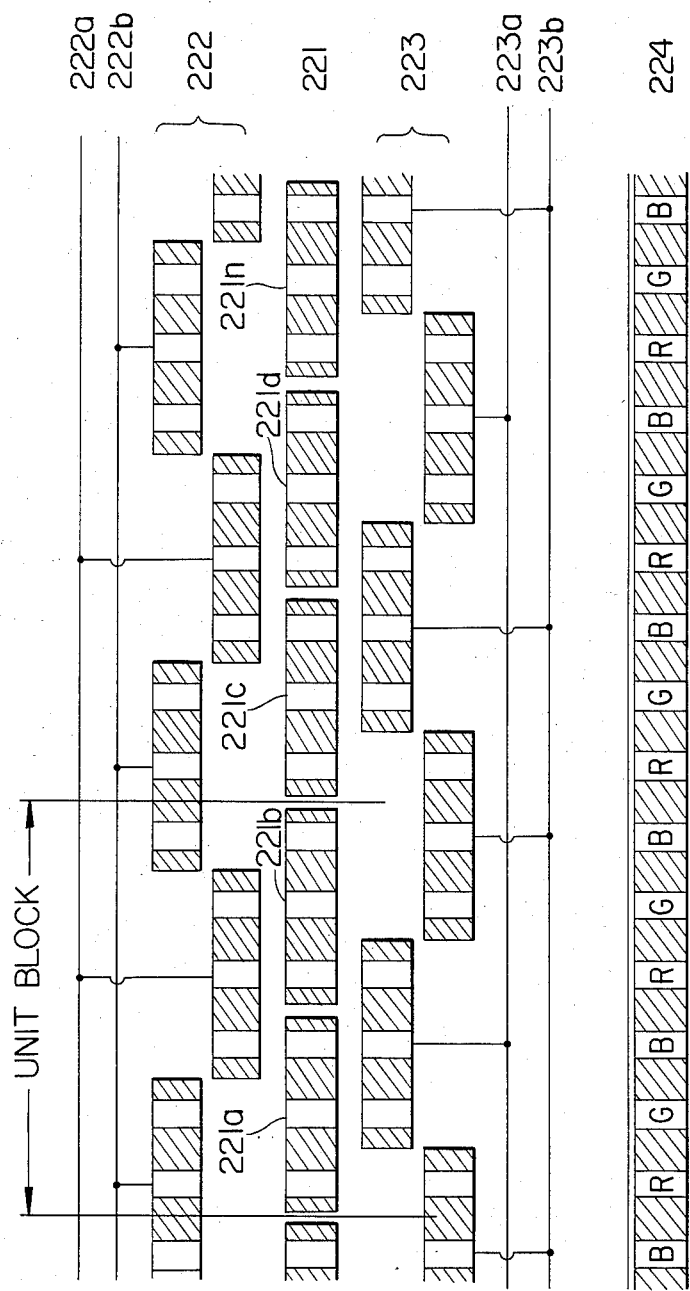
FIG. 29 is a sectional view of the flat CRT according to the thirteenth embodiment of the present invention.

Referring to FIG. 29, first and third electrode groups 222 and 223 comprise the electrode assembles described above, respectively. A second electrode group 221 comprises vertically elongated electrodes 221a, 221b, 221c, ..., and 221n which are aligned at equal intervals along the horizontal direction and each of which has three openings along the horizontal direction. The openings of all the electrodes of the first, second and third electrode groups 222, 221 and 223 are aligned along the electron beam propagation direction. The operation of this modulation electrode section is the same as that shown in FIG. 7. In order to cause the modulated electron beam to be incident on the R phosphor stripe of a phosphor screen 224 when the R signal is applied to the electrode 221a, the ON signal is applied to lines 222b and 223b. In this case, in order to prevent the electron beam from being incident on the G phosphor stripe of the phosphor screen 224, the OFF signal is applied to a line 223a. At the same time, a line 222a and the electrodes 221b to 221n are applied with the OFF signal. As a result, the modulated electron beam passes through the opening of the electrode 221a which corresponds to the R phosphor stripe and is incident on the R phosphor stripe which then emits red light. In order to pass the modulated electron beam through the opening corresponding to the G phosphor stripe of the phosphor screen 224 when the G signal is applied to the electrode 221a, the ON signal is applied to the line 222b, the OFF signal is applied to the line 222a, the ON signal is applied to the line 223a, and the OFF signal is applied to the line 223b.

When the B signal is applied to the electrode 221a and the ON and OFF signals are applied such that the ON signals are applied to the lines 222a and 223a, and the OFF signals are applied to the lines 222b and 223b, only the B phosphor is excited and emits blue light. The above operation is repeated from the electrode 221a to the electrode 221n, and a horizontal image is displayed as if all the R, G and B are scanned.

The n electrode groups may be fixed by an adhesive such as frit glass to constitute a single electrode assembly. According to the structure shown in FIG. 28, the positional misalignment of the stripe electrodes can be eliminated, and the mechanical strength of the electrodes can be improved. In addition, the electrodes can be completely insulated from each other.

Figure 30:
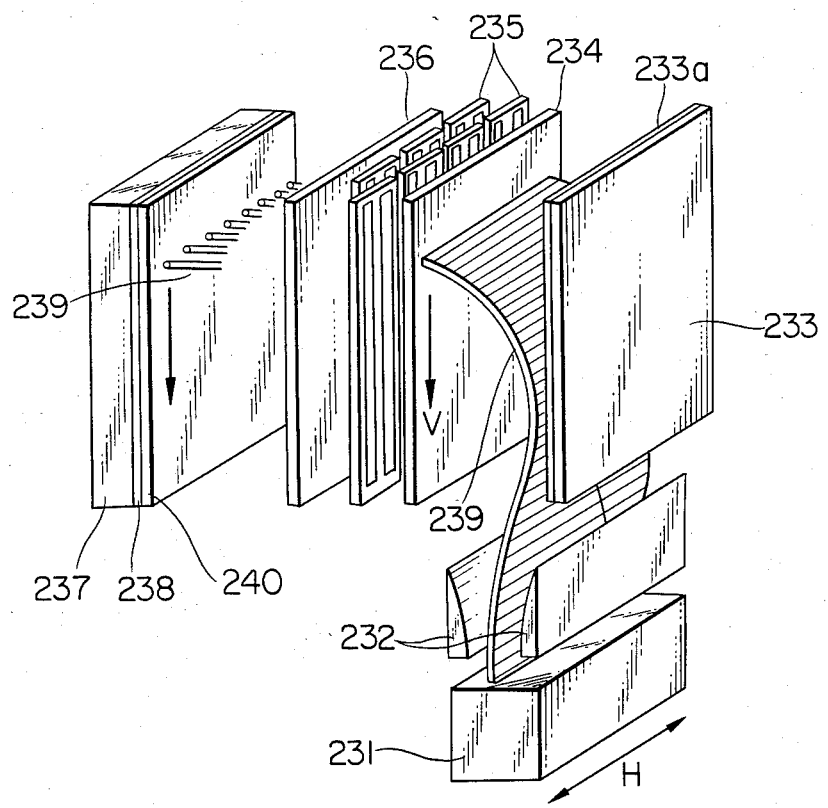
FIG. 30 is an exploded perspective view of a flat CRT according to a fourteenth embodiment of the present invention.

FIG. 30 shows the overall construction of a flat CRT according to a fourteenth embodiment of the present invention. Reference numeral 231 denotes an electron gun for generating a sheet-like beam expanded along the horizontal direction H; and 232, a pair of vertical predeflection electrodes which deflect an electron beam 239 in the vertical direction (V indicated by an arrow) in cooperation with a back plate 233a formed on the inner surface of a faceplate of an envelope 233 (partially illustrated). The deflected electron beam is incident substantially normal to an electrostatic shield electrode 234. The electrode 234 comprises an electrode having openings in the same manner as the electrode group of a matrix modulation section 235, or comprises a mesh electrode. A voltage is applied across the electrode 234 to be set at a higher potential than that of the back plate 233a. The sheet-like electron beam 239 passing through the electrode 234 is incident on the matrix modulation section 235. The matrix modulation section 235 has any one of the structures shown in FIGS. 4A to 29, and a detailed description thereof will be omitted.

The sheet-like electron beam 239 expanded in the horizontal direction is split and modulated. The split and modulated electron beams 239 pass through an electrode 236 having the same construction as the electrode 234. The accelerated electron beams are sequentially incident on predetermined phosphors 238. The R, G and B phosphor dots or stripes 238 of the anode are formed on the inner surface of an envelope 237 (partially illustrated) so as to correspond to the openings of the matrix electrode section. A metallized layer 240 is deposited on the phosphors 238 and can be applied with a high voltage (several kilovolts to 20 kV). The electrode 236 is arranged to shield this high voltage and serves to decrease a drive voltage at a modulation electrode section 235.

In this embodiment, the flat CRT has the electron gun for generating a sheet-like electron beam. This electron beam is vertically deflected by the subdeflection electrodes and main deflectors consisting of the back plate. The vertically deflected electron beam is split and modulated by a modulation electrode section along the horizontal direction. In this modulation electrode section, two or three electrode groups are offset by ½ or ⅓ the electrode pitch, respectively, along the horizontal direction and respectively have electrodes which are aligned at equal intervals along the horizontal direction and each of which has two or three slits or circular openings. Unlike the conventional flat CRT wherein the modulation electrodes correspond to the horizontal pels, respectively, the number of modulation electrodes can be decreased. The number of circuit elements for driving the modulation electrodes is accordingly decreased, thereby decreasing power consumption.

Furthermore, since two electrostatic shield electrodes are arranged in the matrix modulation section, the modulation voltage can also be decreased.

Figure 31:
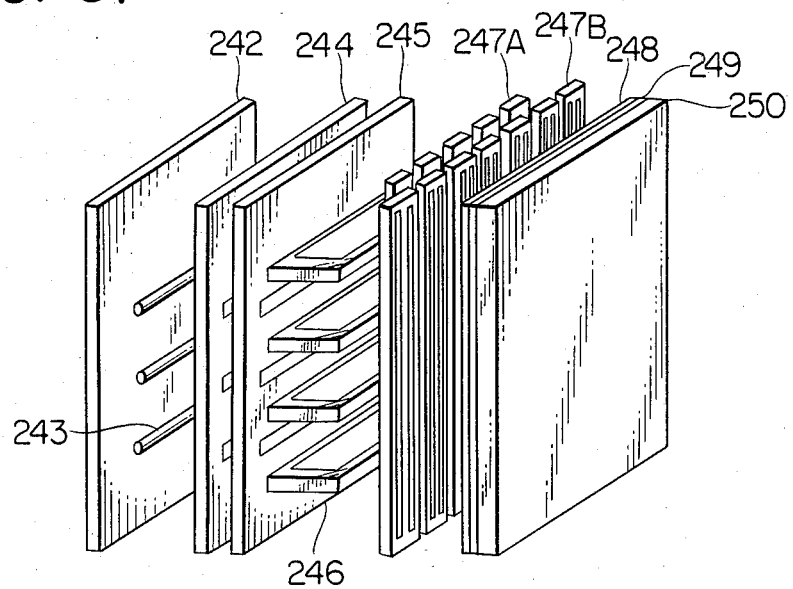
FIG. 31 is an exploded perspective view of a flat CRT according to a fifteenth embodiment of the present invention.

FIG. 31 shows the overall construction of a flat CRT according to a fifteenth embodiment of the present invention. Reference numeral 242 denotes a back plate. The back plate 242 is formed on the inner surface of an envelope (not shown) such that a transparent conductive film ($In_2O_3$ or $SnO_2$ film) or a metal film (Al film) is vacuum-deposited or sputtered. Reference numeral 243 denotes hot cathode lines. Each hot cathode line 243 is formed such that an oxide material ($BaCo_3 + CaCO_3 + SrCO_3$) is applied to the surface of a metal wire (tungsten) of a diameter of 10 to several tens of microns to a thickness of several microns to several tens of microns. Each hot cathode line 243 is applied with a predetermined voltage and is heated to a temperature of 600° to 800° C. Thermions are then uniformly emitted from the hot electrode lines 243. The thermions are shaped to be a sheet-like electron beam in accordance with a potential established by the back plate 242 and a beam extraction electrode 244. This electron beam passes through the openings or slits horizontally formed in the beam extraction electrode 244. Thereafter the sheet-like electron beam passes through an acceleration electrode 245 having substantially the same construction as the beam extraction electrode 244 and passes through a pair of vertical deflectors 246 provided for each hot cathode line 243. Metal films are formed on two major surfaces of an insulating substrate such as a glass or ceramic substrate and are insulated from each other. These metal films serve to perform vertical focusing and vertical deflection. It should be noted that the deflection power, beam spot distortion and deflection distortion are increased when a single hot cathode line and a single pair of deflectors are used, thereby degrading the performance of the CRT. Therefore, the screen is divided into regions which are respectively controlled by the pairs of deflectors and the corresponding hot cathode lines in this embodiment. However, the number of deflectors and the hot cathode lines is not essential to the spirit and scope of the present invention. Furthermore, voltages are respectively applied to the deflectors for interlaced scanning such that one field of the screen consisting of about 260 vertical scanning lines is scanned from the top to the bottom, and for the next field period, the scanning is performed between every adjacent scanning lines. The electron beam which is vertically focused and deflected has a uniform density along the horizontal direction and passes through matrix modulation portions 247A and 247B. The construction of the matrix modulation sections is described above, and a detailed description will be omitted.

The horizontally uniform electron beam is split and modulated by the matrix modulation portions 247A and 247B. Thereafter, the beams are accelerated and are incident on the corresponding phosphors 249. The red, green and blue phosphor dots or stripes 249 of the anode are formed on the inner surface of an envelope 250 so as to respectively align with openings of the matrix modulation portions 247A and 247B at the given pitch. A metallized layer 248 is deposited on the pohsphor screen consisting of the dots or stripes 249. A high voltage of 5 to 20 kV is applied to the metallized layer 248.

In the above embodiment, the hot cathode is used as a means for generating an electron beam. However, a cold cathode can be used in place of the hot cathode to obtain the same effect as in the above embodiment. A shield electrode such as a metal mesh electrode can be inserted between the metallized layer and the matrix modulation portions so as to prevent an adverse effect of an electric field generated by the high voltage applied to the metallized layer.

According to this embodiment, the thermions generated by the heated hot cathode lines are formed into a sheet-like electron beam by the back plate and the beam extraction electrode. This electron beam is deflected by the vertical deflectors and is split through the two or three electrode groups which are offset by ½ or ⅓ the pitch along the horizontal direction. Each electrode group has the vertically elongated stripe electrodes which are aligned at the equal pitch along the electron beam propagation direction and each of which has two or three slits or openings along the horizontal direction. In this manner, the electron beam can be horizontally split and modulated. Unlike the conventional flat CRT, the number of modulation electrodes can be decreased without degradation of an image resolution. Furthermore, the opening of the electrode corresponds to each one of the pels, so that color misregistration can be prevented. As a result, the beam has good linearity and hence a good color image can be obtained.

Figure 32:
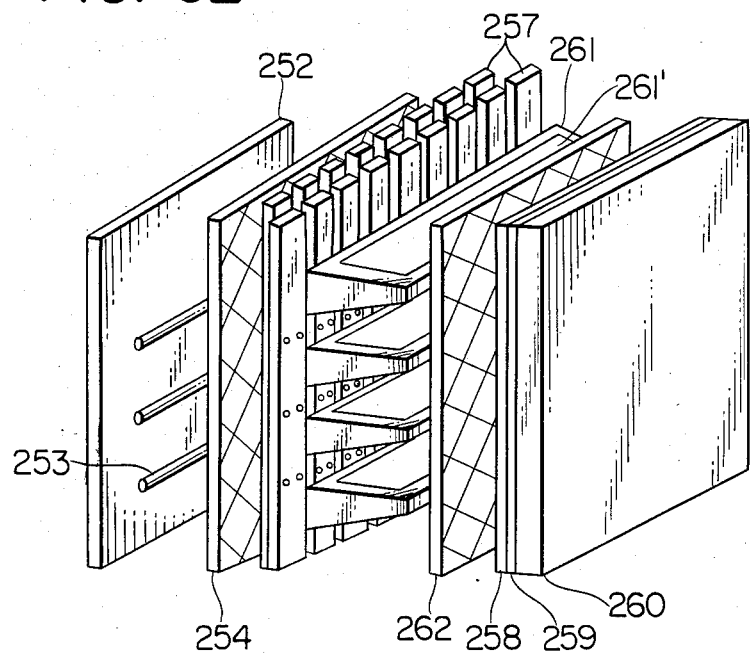
FIG. 32 is an exploded perspective view of a flat CRT according to a sixteenth embodiment of the present invention.

FIG. 32 shows the overall construction of a flat CRT according to a sixteenth embodiment of the present invention. The same reference numerals used in FIG. 32 denote the same parts in FIG. 31, and a detailed description thereof will be omitted.

A beam extraction electrode 254 can comprise an electrode whose slits or openings elongated in the horizontal direction along which the electron beam passes opposes hot cathode lines 253. Alternatively, the beam extraction electrode can comprise a metal mesh electrode to obtain the same result as in the electrode with the slits or openings. The horizontally uniform electron beam is split and is simultaneously modulated through a matrix modulation portion 257. The matrix modulation portion 257 is the same as that described previously. The electron beam passing through these matrix modulation portion 257 is vertically deflected by vertical deflectors 261 opposing the hot cathode lines 253. Each vertical deflector 261 is formed such that metal films (Al films) 261' are deposited on two major surfaces of an insulating substrate such as a glass substrate or ceramic substrate. When a voltage is applied across a pair of opposing deflectors, the electron beam passing therebetween is deflected. The deflected electron beam is incident on phosphor dot or stripes 259 formed on the inner surface of a glass envelope 260. The phosphor dots or stripes 259 are formed at the same pitch as that of the openings of the matrix modulation portion 257. Reference numeral 258 denotes a metallized layer deposited on the phosphor screen. A voltage of 5 to 20 kV is applied to the metallized layer. Reference numeral 262 denotes a shield electrode made of a stripe-like or mesh-like metal material in order to prevent the vertical deflectors 261 from being influenced by an electrical field generated by a high voltage applied to the metallized layer 258. A plurality of thermions generated by the plurality of hot cathode lines 253 are formed into a plurality of electron beams which are deflected by the plurality of vertical deflectors. These electron beams are combined as a single image on the screen.

In the above embodiment, a plurality of hot cathode lines are used. However, the number of hot cathode lines is not limited to a specific numerical value. For example, a single hot cathode line may be used and a pair of vertical deflectors may be used to obtain the same effect as described above.

In this embodiment, the horizontally uniform electron beam obtained by the back plate, the hot cathode lines and the beam extraction electrode is split into beams aligned along the horizontal direction and is simultaneously modulated by the matrix modulation portions. The split and modulated beam spots are vertically deflected and are combined as a single image on the screen. Since the matrix modulation portions split and modulate the horizontally uniform electrodes, the openings of the respective matrix modulation portions only oppose the hot cathode lines. A small number of electrodes is required, and the electrodes can be easily prepared. In this case, the mechanical strength of the electrode is greatly improved. Unlike the conventional flat CRT, the electron beam need not be deflected in the horizontal direction, so that power consumption is decreased, and the color image can be reproduced with high quality.

What is claimed is:

1. A beam scanning device comprising:
   means for generating a horizontally uniform electron beam; and
   means for modulating the horizontally uniform electron beam;
   said electron beam modulating means having first electrode means for modulating the horizontally uniform electron beam and having a plurality of first vertically elongated electrodes each of which has m (m is an integer of not less than 2) openings respectively corresponding to picture elements arranged in a horizontal direction on a phosphor screen and which are aligned along the horizontal direction such that said openings of said first vertically elongated electrodes are equidistantly spaced apart from each other, and
   second electrode means for selectively controlling passage of the horizontally uniform electron beam and having p (p is an integer of not less than 1) electrode groups which are disposed at predetermined intervals along an electron beam propagation direction, each of said p electrode groups including a plurality of second vertically elongated electrodes each of which has n (n is an integer of not less than 2) openings respectively corresponding to the picture elements and which are aligned along the horizontal direction such that said openings of said second vertically elongated electrodes are equidistantly spaced apart from each other, said second vertically elongated electrodes being offset by a predetermined distance along the horizontal direction from said first vertical elongated electrodes.

2. A beam scanning device according to claim 1, wherein said m openings of each of said first vertically elongated electrodes of said first electrode means comprise two openings, said p electrode groups of said second electrode means comprise one electrode group, and said n openings of each of said second vertically elongated electrodes comprise two openings, and said first vertically elongated electrodes are offset by ½ the electrode pitch thereof from said second vertically elongated electrodes in the horizontal direction, said one electrode group including first to third subgroups, and said first subgroup being arranged such that a first set of every third electrodes of said second vertically elongated electrodes is commonly connected to a first line, said second subgroup being arranged such that a second set of every third electrodes of said second vertically elongated electrodes is commonly connected to a second line, said third subgroup being arranged such that a third set of every third electrodes of said second vertically elongated electrodes are commonly connected to a third line; and wherein said first vertically elongated electrodes of said first electrode means are grouped such that every three consecutive electrodes thereof are defined as a unit block, and one horizontal scanning period is divided into a first ⅓ period, a second ⅓ period and a third ⅓ period, a first modulation signal being applied to first and second electrodes of said unit block and a beam OFF signal being applied to a third electrode of said unit block during the first ⅓ period, a second modulation signal being applied to said first electrode and a third electrode of said unit block and the beam OFF signal being applied to said second electrode of said unit block during the second ⅓ period, and a third modulation signal being applied to said second and third electrodes of said unit block and the beam OFF signal being applied to said first electrode of said unit block during the third ⅓ period; and, said second electrode means is operated in synchronism with an operation of said first electrode means such that the beam OFF signal is applied to one of said first to third subgroups, said electrodes of which one subgroup each have two openings which respectively correspond to one each of the two openings of each of two selected ones of said first to third electrodes of said unit block, and a beam ON signal is applied to the remaining two of said first to third subgroups when the modulation signals are applied to said two selected ones of said first to third electrodes during a corresponding one of said first to third ⅓ periods.

3. A beam scanning device according to claim 1, wherein said m openings of each of said first vertically elongated electrodes of said first electrode means comprise three openings, said p electrode groups of said second electrode means comprise first and second electrode groups and said n openings of each of said second vertically elongated electrodes comprise three openings, and said first vertically elongated electrodes of said first electrode means and said second vertically elongated electrodes of said first and second electrode groups of said second electrode means, respectively, are offset by ½ the electrode pitch thereof in the horizontal direction, and said first vertically elongated electrodes of said first electrode means are sandwiched between said second vertically elongated electrodes of said first and second electrode groups of said second electrode means, each of said first and second electrode groups including first and second subgroups, said first subgroup of said first electrode group being arranged such that a first set of every other electrodes of said second vertically elongated electrodes of said first electrode group is commonly connected to a first line, and said second subgroup of said first electrode group being arranged such that a second set of every other electrodes of said second vertically elongated electrodes of said first electrode group is commonly connected to a second line, and said first subgroup of said second electrode group being arranged such that a first set of every other electrodes of said second vertically elongated electrodes of said second electrode group is commonly connected to a third line, and said second subgroup of said second electrode group being arranged such that a second set of every other electrodes of said second vertically elongated electrodes of said second electrode group is commonly connected to a fourth line; and wherein said first vertically elongated electrodes of said first electrode means are groups such that every two consecutive electrodes thereof are defined as a unit block, and one horizontal scanning period is divided into first to sixth 1/6 periods, first, second and third modulation signals being applied to a first electrode of said unit block and a beam OFF signal being applied to a second electrode of said unit block during the first, second and third 1/6 periods, respectively, and the first, second and third modulation signals being applied to said second electrode of said unit block and the beam OFF signal being applied to said first electrode of said unit block during the fourth, fifth and sixth 1/6 periods, respectively; and said second electrode means is operated in synchronism with an operation of said first electrode means, such that a beam ON signal is applied to one of said first and second subgroups of each of said first and second electrode groups through a corresponding line and simultaneously the beam OFF signal is applied to the other one of said first and second subgroups of each of said first and second electrode groups, so as to pass an electron beam modulated during a corresponding one of the 1/6 periods.

4. A beam scanning device according to claim 3, wherein said vertically elongated electrodes of said first electrode means are divided into two groups, one group of said two groups consisting of a first set of every other electrodes of said first vertically elongated electrodes and the other group of said two groups consisting of a second set of every other electrodes of said first vertically elongated electrodes, said one group and said other group being aligned on different planes at a predetermined interval along the electron beam propagation direction and said first vertically elongated electrodes of said one group and said other group being aligned at a predetermined interval along the horizontal direction.

5. A beam scanning device according to claim 3, wherein said first and second subgroups of each of said first and second electrode groups are aligned on different planes at a predetermined interval along the electron beam propagation direction and said second vertically elongated electrodes of said first subgroup and said second subgroup of each of said first and second electrode groups are aligned at a predetermined interval along the horizontal direction.

6. A beam scanning device according to claim 3, wherein said three openings of each electrode of said second electrode means are connected with each other to constiute an elongated opening.

7. A beam scanning device according to claim 1, wherein
said m openings of each of said first vertically elongated electrodes of said first electrode means comprise two openings,
said p electrode groups of said second electrodes means comprise one electrode group and said n openings of each of said second vertically elongated electrodes comprise two openings, and
said first vertically elongated electrodes are offset by ½ the electrode pitch thereof from said second vertically elongated electrodes along the horizontal direction, and
said one electrode group of said second electrode means including first and second subgroups, said first subgroup being arranged such that a first set of every other electrodes of said second vertically elongated electrodes is commonly connected to a first line, and said second subgroup being arranged such that a second set of every other electrodes of said second vertically elongated electrodes is commonly connected to a second line; and wherein
said first vertically elongated electrodes of said first electrode means are grouped such that every six consecutive electrodes thereof are defined as a unit block, and
one horizontal scanning period is divided into first and second half periods, first, second and third modulation signals each being applied to two of first to sixth electrodes of said unit block during the first half period, and the first, second and third modulation signals each being applied to a different two of said first to sixth electrodes during the second half period; and
said second electrode means is operated in synchronism with an operation of said first electrode means, such that a beam ON signal is applied to one of said first and second subgroups during the first half period and a beam OFF signal is applied to the other one of said first and second subgroups during the second half period.

8. A beam scanning device according to claim 1, wherein
said m openings of each of said first vertically elongated electrodes of said first electrode means comprise three openings,
said p electrode groups of said second electrode means comprise first and second electrode groups and said n openings of each of said second vertically elongated electrodes comprise three openings, and
said first vertically elongated electrodes of said first electrode means and said second vertically elongated electrodes of said first and second electrode groups of said second electrode means, respectively, are offset by ⅓ the electrode pitch thereof in the horizontal direction,
each of said first and second electrode groups including first, second and third subgroups, and
said first subgroup of said first electrode group being arranged such that a first set of every third electrodes of said second vertically elongated electrodes of said first electrode group is commonly connected to a first line, said second subgroup of said first electrode group being arranged such that a second set of every third electrodes of said second vertically elongated electrodes of said first electrode group is commonly connected to a second line, said third subgroup of siad first electrode group being arranged such that a third set of every third electrodes of said second vertically elongated electrodes of said first electrode group is commonly connected to a third line, said first subgroup of said second electrode group being arranged such that a first set of every third electrodes of said second vertically elongated electrodes of said second electrode group is commonly connected to a fourth line, said second subgroup of said second electrode group being arranged such that a second set of every third electrodes of said second vertically elongated electrodes of said second electrode group is commonly connected to a fifth line, and said third subgroup of said second electrode group being arranged such that a third set of every third electrodes of said second vertically elongated electrodes of said second electrode group is commonly connected to a sixth line; and
said first vertically elongated electrodes of said first electrode means are divided such that every three consecutive electrodes thereof are defined as a unit block, and
one horizontal scanning period is divided into first, second and third ⅓ periods, first, second and third modulation signals being respectively supplied to first, second and third electrodes of said unit block during the first ⅓ period, and the first, second and third modulation signals being supplied to the first to third electrodes of said block during the second and third ⅓ periods in combinations which are different from that supplied during the first ⅓ period; and
said second electrode means is operated in sychronism with an operation of said electrode means, such that beam ON and OFF signals are selectively applied to said first to third subgroups of each of said first and second electrode groups through corresponding lines so as to pass an electron beam through one opening selected from the three openings of each electrode of said first electrode means ine each ⅓ period of the first to the third ⅓ periods.

9. A beam scanning device according to claim 1, wherein
said m openings of each of said first vertically elongated electrodes ofsaid first electrode means comprise four openings,
said p electrode groups of said second electrode means comprise first and second electrode groups and said n openings of each of said second vertically elongated electrodes comprise two openings, and said second vertically elongated electrodes of said first and second electrode groups of said second electrode means are offset by ½ the electrode pitch thereof from each other and from said first vertically elongated electrode of said first electrode means, each of said first and second electrode groups including first and second subgroups, said first subgroups of said first electrode group being arranged such tht a first set of every other electrodes of said second vertically elongated electrodes of said first electrode group is commonly connected to a first line and said second subgroup of said first electrode group being arranged such that a second set of every other electrodes of said second vertically elongated electrodes of said first electrode group are commonly connected to a second line, and said first subgroup of said second electrode group being arranged such that a first set of every other electrodes of said second vertically elongated electrodes of said second electrode group is commonly connected to a third line and said second subgroup of said second electrode group being arranged such that a second set of every other electrodes of said second vertically elongated electrodes of said second electrode group are commonly connected to a fourth line; and wherein said first vertically elongated electrodes of said first electrode group are grouped such that every three consecutive electrodes thereof are defined as a unit block, and one horizontal scanning period is divided into first, second, third and fourth ¼ periods, first, second and third modulations signals being applied to first to third electrodes of said unit block in combinations which are different in the first, second, third and fourth ¼ periods, respectively; and said second electrode means is operated in synchronism with an operation ofs aid first electrode means, such that beam ON and OFF signals are selectively applied to said first and second subgroups of each of said first and second electrode groups through corresponding lines so as to pass an electron beam through one opening selected from the four openings of each electrode of said first electrode means in each ¼ period of the first to the fourth ¼ periods.

10. A beam scanning device according to claim 1, wherein said m openings of each of said first vertically elongated electrodes of said first electrode means comprise six openings, said p electrode groups of said second electrode means comprise first, second and third electrode groups, and said n openings of each of said second vertically elongated electrodes comprise three openings, and said second vertically elongated electrode of said first to third electrode groups of aid second electrode means are offset by ⅓ the electrode pitch thereof from each other from said first vertically enlongated electrodes of said first in the horizontal direction, each of said first to third electrode groups including first and second subgroups, and said first subgroup of said first electrode group being arranged such that a first set of every other electrodes of said second vertically elongated electrodes of said second vertically elongated electrodes of said first electrode group is commonly connected to a first line and said second subgroup of said first electrode group being arranged such that a second set of every other electrodes of said second vertically elongated electrodes of said first electrode group is commonly connected to a second line, and said first and second subgroups of said second and third electrode groups being arranged in the same manner as those of said first electrode group; and wherein said first vertically elongated electrodes of said first electrode means are grouped such that each electrode thereof is defined as a unit block, and one horizontal scanning period is divided into first to sixth 1/6 periods, first, second and third modulation signals being supplied to said unit block respectively during the first, second and third 1/6 periods, and fourth, fifth and sixth modulation signals being supplied to said unit block respectively during the fourth, fifth and sixth 1/6 periods; and said second electrode means is operated in synchronism with an operation of said first electrode means, such that a beam ON signal is supplied to one of said first and second subgroups of each of said first to third electrode groups through a corresponding line and simultaneously a beam OFF signal is supplied to the other one of said first and second subgroups so as to pass an electron beam through one opening selected from the six openings of each electrode of said first electrode means in each 1/6 period of the first to the sixth 1/6 periods.

11. A beam scanning device according to claim 1, wherein said m openings of each of said first vertically elongated electrodes of said first electrode means comprise six openings, said p electrode groups of said electrode means comprise first and second electrode groups, and said n openings of each of said second vertically elongated electrodes comprise two openings, and said second vertically elongated electrodes of said first and second electrode means are offset by ½ the electrode pitch thereof from each other in the horizontal direction, each of said first and second electrode groups including first, second and third subgroups, and said first subgroup of said first electrode group being arranged such that a first set of every third electrodes of said second vertically elongated electrodes of said first electrode group is commonly connected to a first line, said second subgroup of said first electrode group being arranged such that a second set of every third electrodes of said second vertically elongated electrodes of said first electrode group is commonly connected to a second line, and said third subgroup of said first electrode group being arranged such that a third set of every third electrodes of said second vertically elongated electrodes of said first electrode group is commonly connected to a third line, and said first to third subgroups of said second electrode group being arranged in the same manner as those of said first electrode group; and wherein said first vertically elongated electrodes of said first electrode means are groups such that each electrode is defined as a unit block, and one horizontal scanning period is divided into first to sixth 1/6 periods, first, second and third modulation signals being applied to said unit block respectively during the first, second and third 1/6 periods, and fourth fifth and sixth modulation signals being applied to said unit block respectively during the fourth, fifth and sixth 1/6 periods, and said second electrode means is operated in synchronism with an operation of said second electrode means, such that beam ON and OFF signals are selectively supplied to said first to third subgroups of each of said first and second electrode groups through corresponding lines so as to pass an electron beam through one opening selected from the six openings of each electrode of said first electrode means in each 1/6 period of the first to the sixth 1/6 periods.

12. A beam scanning device according to claim 1, wherein one of said first and second electrode means comprises a plurality of electrode groups which are connected to a common wiring section and each of which comprises vertically elongated electrodes each having m openings along the horizontal direction, said electrodes being aligned at an interval corresponding to an integer multiple of a width of each of said electrodes along the horizontal direction, said electrode groups being arranged such that said electrodes of one electrode groups of said plurality of electrode groups are aligned to respectively correspond to spaces between every adjacent electrode of another electrode group of said plurality of electrode groups and being electrically insulated from each other.

13. A beam scanning device according to claim 1, wherein said electron beam generating means comprises an electron gun for generating a sheet-like electron beam expanded in the horizontal direction and emitted parallel to a vertical scanning direction of said phosphor screen, and deflectors for deflecting the horizontally uniform electron beam in a direction substantially perpendicular to said phosphor screen.

14. A beam scanning device according to claim 1, wherein said electron beam generating means comprises hot cathode lines disposed to be substantially parallel to said phosphor screen, and a back plate and a beam extraction electrode which are disposed to sandwich said hot cathode lines therebetween.

15. A beam scanning device according to claim 1, wherein said picture elements on said phosphor screen comprise red, green and blue phosphor stripes which are repeatedly arranged at a predetermined pitch in a given order, and wherein a metallized layer is deposited on said phosphor stripes.

16. A beam scanning device according to claim 1, wherein said second electrode means comprises a plurality of electrode groups, and said second vertically elongated electrodes of different groups of said plurality of electrode groups are offset by a predetermined distance along the horizontal direction from each other.

17. A beam scanning device comprising electron beam generating means for generating a horizontally uniform electron beam; electron beam modulating means; and a phosphor screen, said electron beam modulating means comprising p (p is an integer of not less than 2) electrode groups each of which has a plurality of vertically elongated electrodes, each of which has n (n is an integer of not less than 2) openings along a horizontal direction and which are arranged such that all of said openings thereof are equidistantly formed along the horizontal direction, said p electrode groups each having a plurality of vertically elongated electrodes which are aligned at predetermined intervals along an electron beam propagation direction and are offset by a predetermined distance along the horizontal direction, and each of said p electrode groups comprising a plurality of subgroups, beam modulation signals and beam ON/OFF signals being selectively supplied to said plurality of subgroups so as to cause electron beams to be incident on predetermined positions on the phosphor screen.

18. A beam scanning device according to claim 17, wherin n openings comprise two openings, said p electrode groups comprise first and second electrode groups, said first electrode group being offset by ½ the electrode pitch thereof from said second electrode group along a horizontal direction, each of said first and second electrode groups comprising first, second and third subgroups,; and wherein one horizontal scanning period is divided into first, second and third ⅓ periods, a beam ON signals, a first modulation signal, and a beam OFF signal being respectively supplied to said first to third subgroups of said first electrode group, and simultaneously, a second modulation signal, the beam OFF signal and the beam ON signal being respectively supplied to said first to third subgroups of said second electrode group during the first ⅓ period, the beam ON signal, a third modulation signal, the beam OFF signal being respectively supplied to said third, first and second subgroups of said first electrode group, and simultaneously, a fourth modulation signal, the beam OFF signal and the beam ON signal being respectively supplied to said third, first and second subgroups of said second electrode group during the second ⅓ period, and the beam ON signal, a fifth modulation signal and the beam OFF signal being respectively supplied to said second, third and first subgroups of said first electrode group, and simultaneously, a sixth modulation signal, the beam OFF signal and the beam ON signals being respectively supplied to said second, third and first subgroups of said second electrode group during the third ⅓ period.

* * * * *